(12) United States Patent
Park et al.

(10) Patent No.: US 11,310,458 B2
(45) Date of Patent: Apr. 19, 2022

(54) DISPLAY DEVICE

(71) Applicant: LG ELECTRONICS INC., Seoul (KR)

(72) Inventors: Jinyung Park, Seoul (KR); Jeehoon Bong, Seoul (KR); Seunghyun Lee, Seoul (KR); Younkyung Lee, Seoul (KR); Sanghyuck Lee, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/958,669

(22) PCT Filed: Nov. 22, 2018

(86) PCT No.: PCT/KR2018/014440
§ 371 (c)(1),
(2) Date: Jun. 26, 2020

(87) PCT Pub. No.: WO2019/132260
PCT Pub. Date: Jul. 4, 2019

(65) Prior Publication Data
US 2021/0067731 A1    Mar. 4, 2021

(30) Foreign Application Priority Data
Dec. 27, 2017 (KR) .................. 10-2017-0181496

(51) Int. Cl.
*H04N 5/655* (2006.01)
*H04N 5/445* (2011.01)

(52) U.S. Cl.
CPC .............. *H04N 5/655* (2013.01); *H04N 5/445* (2013.01)

(58) Field of Classification Search
CPC ........ H04N 5/64; H04N 5/655; H04N 5/7475; H04N 2005/7483; H04N 5/445;
(Continued)

(56) References Cited

U.S. PATENT DOCUMENTS

2009/0190212 A1* 7/2009 Wang ..................... G03B 21/58
359/461
2018/0103552 A1* 4/2018 Seo ....................... G06F 1/1624

FOREIGN PATENT DOCUMENTS

KR    1020120014872    2/2012
KR    1020150004547    1/2015
(Continued)

OTHER PUBLICATIONS

PCT International Application No. PCT/KR2018/014440, Written Opinion of the International Searching Authority dated Feb. 27, 2019, 22 pages.
(Continued)

*Primary Examiner* — John W Miller
*Assistant Examiner* — Humam M Satti
(74) *Attorney, Agent, or Firm* — Lee, Hong, Degerman, Kang & Waimey PC

(57) ABSTRACT

The present invention relates to a display device and a control method therefor. The display device comprises: a body including a fixed body configured to respond to an output format of various contents, and an extended body coupled to at least one corner of the fixed body so as to slide on the fixed body to expand or contract a front area; and a flexible display provided on the front surface of the body and having an output area and a non-output area rolled at an end of the output area and provided on a rear area of the output area, wherein the flexible display is configured such that the ratio of the output area to the non-output area is variable in accordance with the front area of the body.

3 Claims, 19 Drawing Sheets

(58) Field of Classification Search
CPC ............. H04N 21/431; H04N 21/4316; G03B 21/145; G03B 21/30; G03B 21/58–585; G06F 1/1652; G09F 9/301; G02F 1/133305

See application file for complete search history.

(56) References Cited

FOREIGN PATENT DOCUMENTS

| KR | 1020170043347 | 4/2017 |
| KR | 1020170062121 | 6/2017 |
| KR | 101752750 | 7/2017 |
| KR | 1020170081559 | 7/2017 |
| KR | 1020170090295 | 8/2017 |

OTHER PUBLICATIONS

Korean Intellectual Property Office Application No. 10-2017-0181496, Office Action dated Feb. 14, 2022, 5 pages.

* cited by examiner

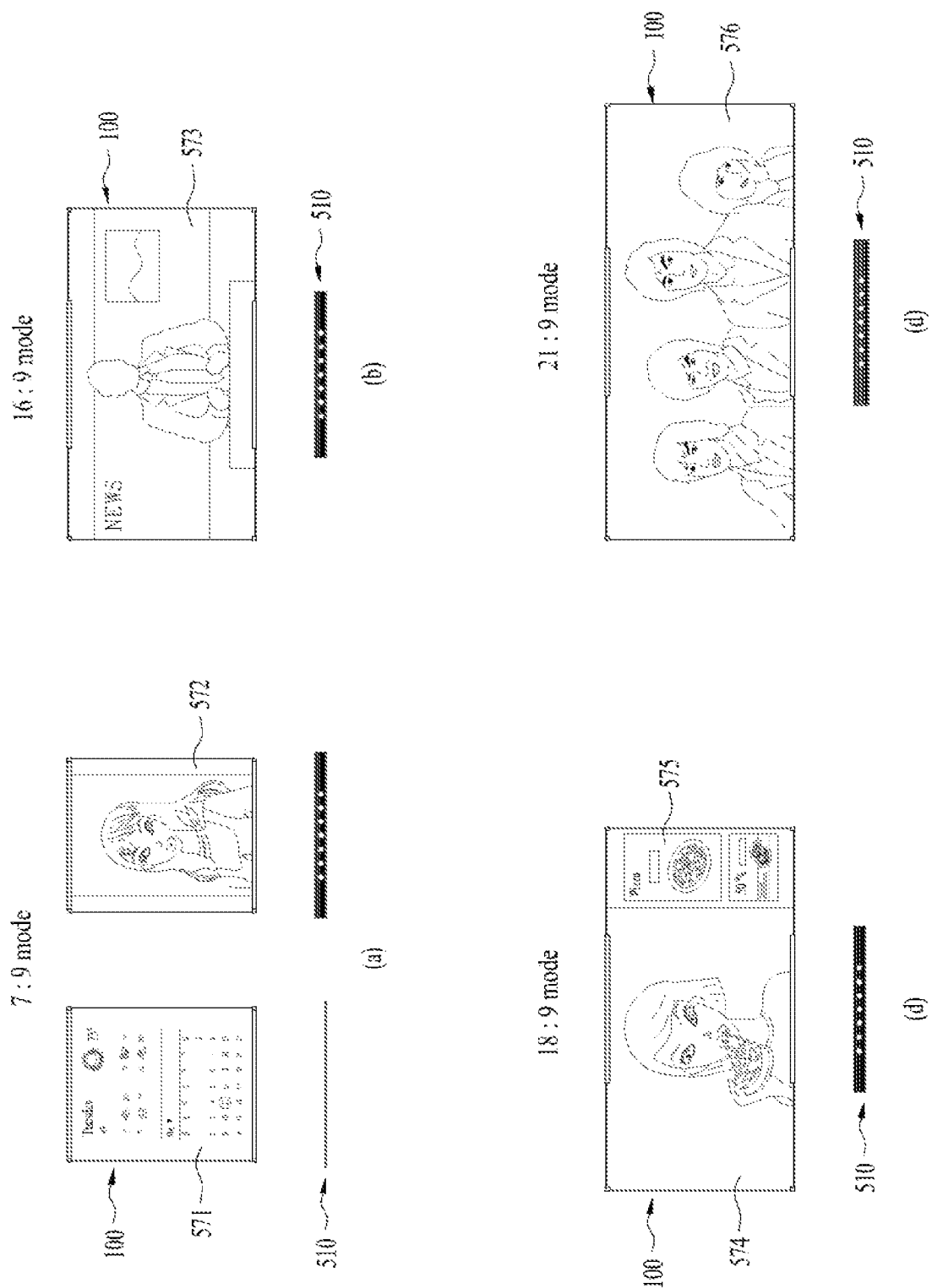

DISPLAY DEVICE

CROSS-REFERENCE TO RELATED APPLICATIONS

This application is the National Stage filing under 35 U.S.C. 371 of International Application No. PCT/KR2018/014440, filed on Nov. 22, 2018, which claims the benefit of earlier filing date and right of priority to Korean Application No. 10-2017-0181496, filed on Dec. 27, 2017, the contents of which are all incorporated by reference herein in their entirety.

TECHNICAL FIELD

The present disclosure relates to a display device of which output area is varied depending on properties of contents, etc.

BACKGROUND ART

A display device such as TV performs various functions. The display device may organically perform screen output by interworking with an external terminal, or may output a plurality of contents to one screen.

Meanwhile, with the development of technologies, a display of the display device may be implemented in the form of a flexible display that may be flexible.

In accordance with a complex output type of contents and implementation of the flexible display, the display device of which output area is variable may be considered.

DISCLOSURE OF THE INVENTION

Technical Problem

An object of the present disclosure is to provide a display device that is variable in accordance with various contents output types to form an efficient output area.

Technical Solutions

To achieve this object and other advantages, according to one aspect of the present disclosure, a display device comprises a body including a fixed body and an extended body coupled to at least one corner of the fixed body and slid with respect to the fixed body to enlarge or downsize a front area, and a flexible display provided on a front surface of the body, including an output area and anon-output area wound at an end of the output area and provided on a rear surface of the output area, wherein the flexible display varies a ratio of the output area and the non-output area to correspond to the front area of the body.

In another aspect of the present disclosure, the flexible display includes a display panel, and a display support supporting a rear surface of the output area of the display panel, and the display panel is provided to be wound by surrounding at least one corner of the display support, and the display support controls a ratio of the output area and the non-output area by varying an interval of a plurality of frames having different widths.

Also, in another aspect of the present disclosure, the display device further comprises a rotational driving unit provided in the fixed body, forming a rotary shaft vertical to the output area to provide a rotational force, a rail unit including a plurality of points provided in the extended body, forming different distances from the rotary shaft, and a rotary arm having one end connected with the rotational driving unit and the other end jointed to the rail unit, delivering a sliding force of the extended body by moving the other end along the rail by the rotational force.

Also, in another aspect of the present disclosure, the display device further comprises a second pinion gear provided in the body, a third pinion gear provided in the flexible display, controlling a winding level of the display panel, and a transmission gear jointing the second pinion gear to the third pinion gear and delivering movement of the second pinion gear to the second pinion gear.

Also, in another aspect of the present disclosure, a display device comprises a receiving unit receiving screen information and output direction information of an external terminal, a display unit having an output area capable of being enlarged or downsized with respect to a direction of at least one of four corners, a driving unit driven to enlarge or downsize an output area of the display unit, and a controller controlling the driving unit in accordance with the received output direction information of the external terminal.

Also, in another aspect of the present disclosure, the output area is respectively formed at left and right sides of the display unit, and the controller controls the driving unit to downsize the output area if the received screen direction information of the external terminal is portrait and controls the driving unit to enlarge the output area if the received screen direction information of the external terminal is landscape.

Also, in another aspect of the present disclosure, the receiving unit receives each screen information and output direction information from a plurality of external terminals, and the controller controls the display unit to output screen information of the external terminals by arranging the screen information in an up and down direction if each received output direction information of the external terminals is landscape and controls the driving unit to match a left and right boundary of each screen information of the external terminals with a boundary of the output area of the display unit.

Also, in another aspect of the present disclosure, the receiving unit receives each screen information and output direction information from a plurality of external terminals, and the controller controls the display unit to output each screen information of the external terminals by arranging the screen information in a left and right direction if at least one of each received output direction information of the external terminals is portrait.

Also, in another aspect of the present disclosure, if at least one of each received output direction information of the external terminals is landscape, the controller controls the display unit to output each screen information such that a vertical length of the screen information of the external terminal, which includes the portrait information, is equal to a vertical length of the screen information of the external terminal, which includes the landscape information.

Also, in another aspect of the present disclosure, a display device comprises a display unit having an output area capable of being enlarged or downsized with respect to a direction of at least one of four corners, a driving unit driven to enlarge or downsize an output area of the display unit, and a controller recognizing a screen ratio and size information of at least one content which will be output, determining output arrangement of the at least one content, and controlling the driving unit to enlarge or downsize the output area of the display unit to be suitable for the determined screen ratio and size.

Advantageous Effects

Advantages of the display device according to the present disclosure are as follows.

According to at least one of the embodiments of the present disclosure, a screen area which is not output may be visible to a user within a minimum range.

Also, according to at least one of the embodiments of the present disclosure, a body may stably be enlarged or downsized.

According to at least one of the embodiments of the present disclosure, a plurality of contents may efficiently be output to one screen.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 19 illustrates an example of a display device according to the present disclosure.

DETAILED DESCRIPTION OF THE INVENTION

Figure 1:
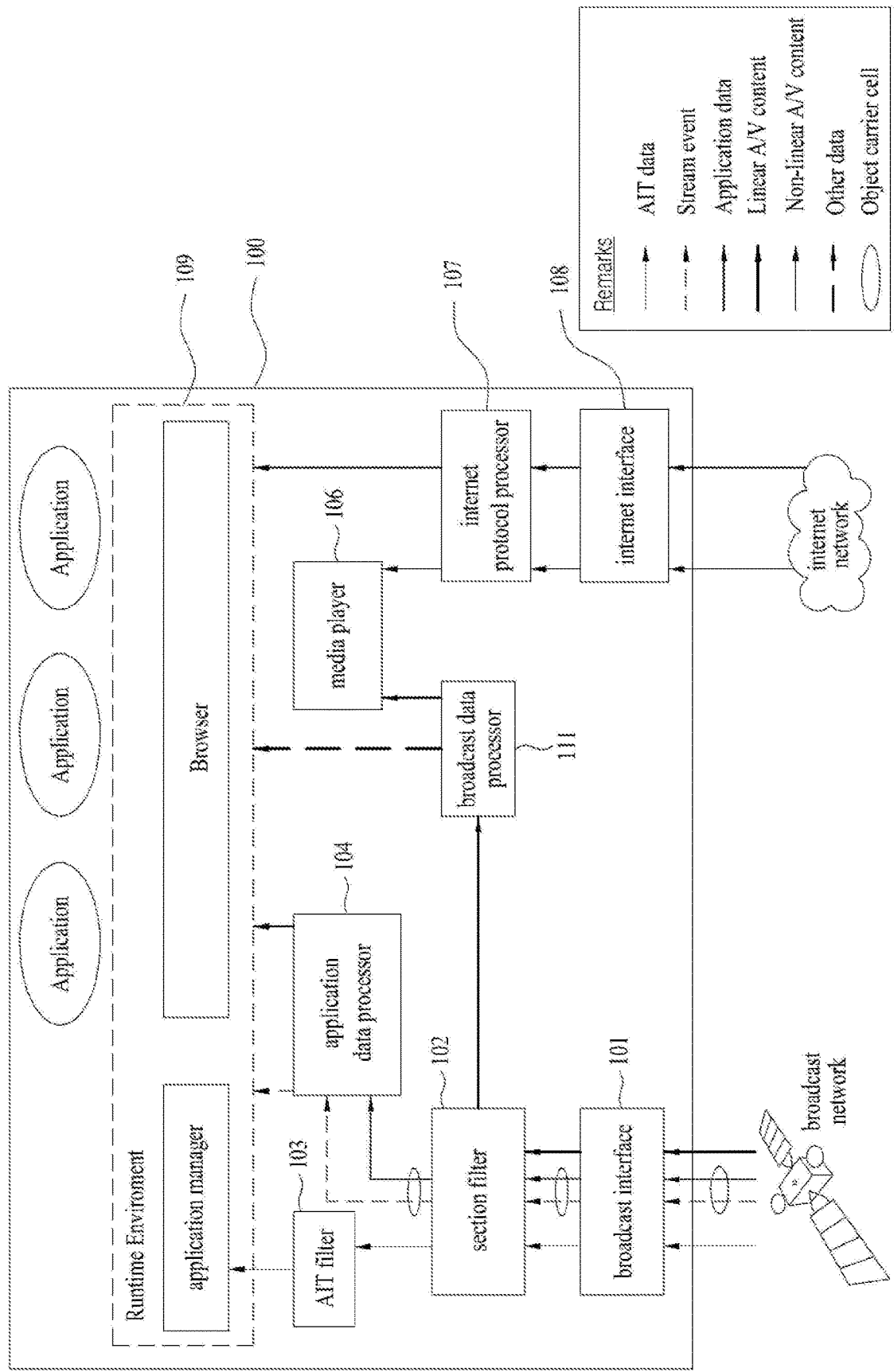
FIG. 1 is a block diagram illustrating elements of a display device according to one embodiment of the present disclosure.

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other.

Also, in description of the embodiments disclosed in this specification, if detailed description of the disclosure known in respect of the present disclosure is determined to make the subject matter of the embodiments disclosed in this specification obscure, the detailed description will be omitted.

Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present disclosure.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to "another element" means that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Meanwhile, a display device disclosed in this specification corresponds to an intelligent network TV that additionally provides a computer support function in addition to a broadcasting receiving function. Accordingly, as the display device is provided with Internet function additionally to a broadcasting receiving function, the display device may be provided with a more convenient user interface such as a manual input unit, a touch screen or a spatial remote controller. Also, the display device enables e-mailing, web browsing, banking or games by accessing Internet or computer in accordance with the support of wire or wireless Internet function. For these various functions, a standardized general-purpose operating system (OS) may be used.

Therefore, since the network TV disclosed in the present disclosure may freely be provided with or delete various applications on a general-purpose OS kernel, the network TV may perform user-friendly various functions. Moreover, for convenience of description in this specification, the display device and the network TV may be used together, and it will be apparent that the scope of the present disclosure should basically be defined by claims.

Although the embodiments of the present disclosure will be described in detail with reference to the accompanying drawings and the disclosure disclosed in the accompanying drawings, the present disclosure is not limited or restricted by the embodiments.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

FIG. 1 is a block diagram illustrating elements of a display device according to one embodiment of the present disclosure. Hereinafter, the elements of the display device according to one embodiment of the present disclosure will be described with reference to FIG. 1.

As shown in FIG. 1, the display device 100 according to one embodiment of the present disclosure is connected with a broadcast network and Internet network. The display device 100, for example, corresponds to a network TV, a smart TV, HBBTV, a web TV, and IPTV.

Also, the display device 100 includes a broadcast interface 101, a section filter 102, an AIT filter 103, an application data processor 104, a broadcast data processor 111, a media player 106, an internet protocol processor 107, an internet interface 108, and a runtime module 109.

Application Information Table (AIT) data, real time broadcast content, application data and a stream event are received through the broadcast interface 101. The real time broadcast content may be referred to as Linear A/V Content.

The section filter 102 performs section filtering for four data received through the broadcast interface 101 to transmit AIT data to the AIT filter 102, transmit linear A/V content to the broadcast data processor 105, and transmit stream event and application data to the application data processor 104.

Non-Linear A/V content and application data are received through the Internet interface 108. For example, the Non-Linear A/V content may be Content On Demand (COD) application.

The Non-Linear A/V content may be transmitted to the media player 106, and the application data may be transmitted to the runtime module 109.

Moreover, the runtime module 109, as shown in FIG. 1, includes an application manager and a browser. The application manager controls a life cycle on interactive application by using AIT data, and the browser displays and processes the interactive application.

Figure 2:
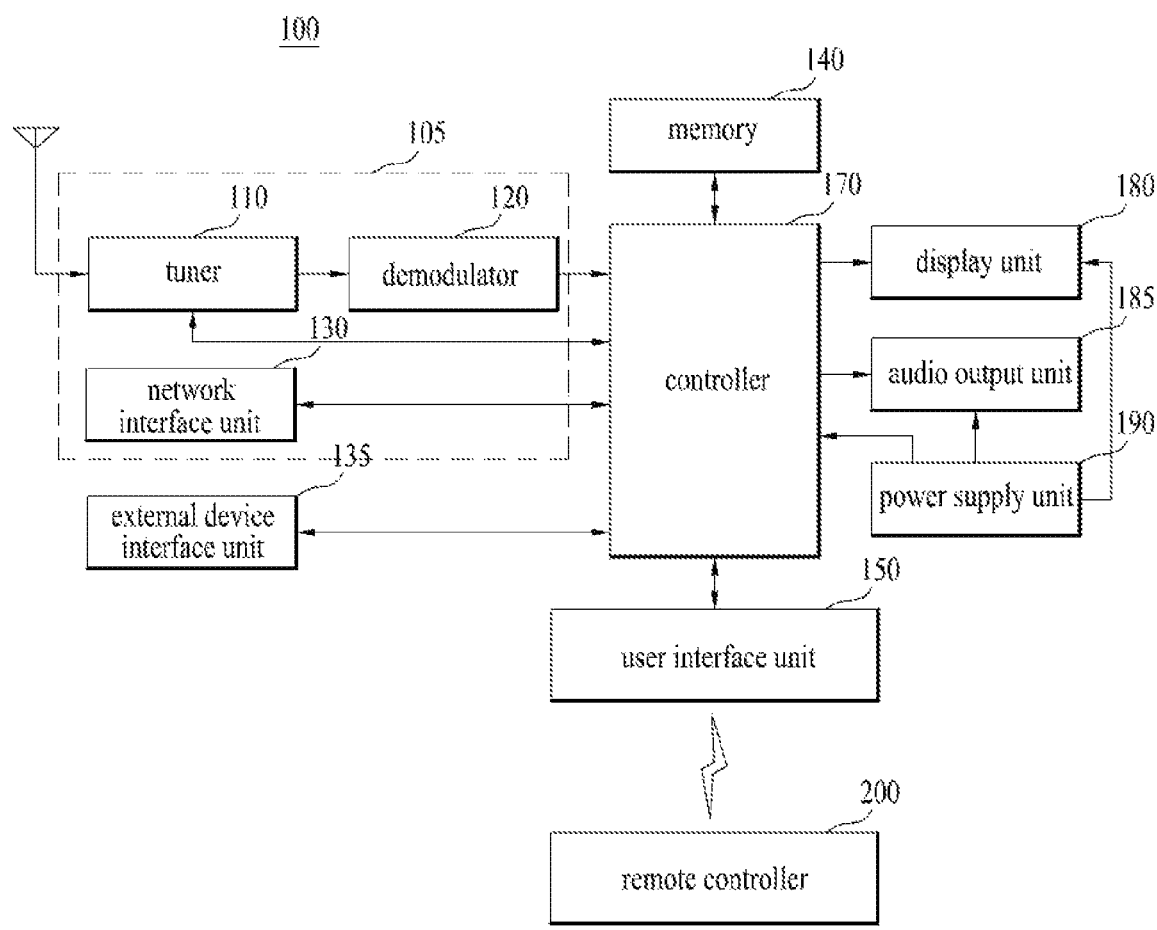
FIG. 2 is a block diagram illustrating elements of a display device according to another embodiment of the present disclosure.

FIG. 2 is a block diagram illustrating elements of a display device according to another embodiment of the present disclosure. Hereinafter, the elements of the display device according to another embodiment of the present disclosure will be described with reference to FIG. 2.

As shown in FIG. 2, the display device 100 according to another embodiment of the present disclosure may include a broadcast receiving unit 105, an external device interface unit 135, a storage unit 140, a user input interface unit 150, a controller 170, a display unit 180, an audio output unit 185, a power supply unit 190, and a camera unit (not shown). The broadcast receiving unit 106 may include a tuner 110, a demodulator 120, and a network interface unit 130.

The tuner 110 may select a channel selected by a user among Radio Frequency (RF) broadcast signals received through an antenna, or an RF broadcast signal corresponding to all pre-stored channels. Also, the tuner 110 converts the selected RF broadcast signal into an intermediate frequency signal or a baseband image or sound signal.

For example, the tuner 110 converts the selected RF broadcast signal into a digital IF signal DIF if it is a digital broadcast signal, or into an analog baseband image or sound signal CVBS/SIF if it is an analog broadcast signal. That is, the tuner 110 may process both a digital broadcast signal and an analog broadcast signal, and the analog baseband image or sound signal CVBS/SIF output from the tuner 110 may directly be input to the controller 170.

Also, the tuner 110 may receive an RF broadcast signal of a single carrier according to the Advanced Television System Committee (ATSC) format or an RF broadcast signal of a plurality of carriers according to the Digital Video Broadcasting (DVB) format.

Meanwhile, the tuner 110 may sequentially select RF broadcast signals of all broadcast channels stored through a channel memory function from RF broadcast signals received through an antenna, and then, may convert the selected RF broadcast signals into an intermediate frequency signal or a baseband image or sound signal.

The demodulator 120 may receive the digital IF signal DIF converted by the tuner 110, and then, may perform a demodulation operation thereon.

For example, if the digital IF signal output from the tuner 110 is the ATSC format, the demodulator 120 performs an 8-Vestigal Side Band (8-VSB) demodulation. Also, the demodulator 120 may perform channel decoding. To this end, the demodulator 120 may include a Trellis Decoder, a De-interleaver, and a Reed Solomon Decoder to perform Trellis decoding, de-interleaving, and Reed Solomon decoding.

For example, if the digital IF signal output from the tuner 110 is the DVB format, the demodulator 120 performs Coded Orthogonal Frequency Division Modulation (COFDMA) demodulation. Also, the demodulator 120 may perform channel decoding. To this end, the demodulator 120 may include a convolution decoder, a De-interleaver, and a Reed Solomon Decoder to perform convolutional decoding, de-interleaving, and Reed Solomon decoding.

The demodulator 120 may output a stream signal TS after performing demodulation and channel decoding. At this time, the stream signal may be a signal into which an image signal, sound signal, or a data signal is multiplexed. For example, the stream signal may be an MPEG-2 Transport Stream (TS) into which an MPEG-2 standard image signal and a Dolby AC-3 standard sound signal are multiplexed. In more detail, the MPEG-2 TS may include a 4 byte header and a 184 byte payload.

Meanwhile, the demodulator 120 may include an ATSC demodulator and a DVB demodulator separately in accordance with the ATSC format and the DVB format.

The stream signal output from the demodulator 120 may be input to the controller 170. The controller 170 may output an image to the display unit 180 and a sound to the audio output unit 185 after demultiplexing and processing an image/sound signal.

The external device interface unit 135 may connect an external device with the display device 100. To this end, the external device interface unit 135 may include an A/V input/output unit (not shown) or a wireless communication unit (not shown).

The external device interface unit 135 may be used for wire/wireless connection of an external device such as a Digital Versatile Disk (DVD) player, a Blu ray player, a game console, a camera, a camcorder, and a computer (such as a notebook computer). The external device interface unit 135 delivers an image, sound, or data signal externally input from a connected external to the controller 170 of the display device 100, and may output the image, sound, or data signal processed in the controller 170 to the connected external device. To this end, the external device interface unit 135 may include an A/V input/output unit (not shown) or a wireless communication unit (not shown).

The A/V input/output unit may include a USB terminal, a Composite Video Banking Sync (CVBS) terminal, a component terminal, an S-video terminal (i.e., an analog type), a Digital Visual Interface (DVI) terminal, a High Definition Multimedia Interface (HDMI) terminal, an RGB terminal, and a D-SUB terminal, in order to input an image and sound signal of an external device to the network TV 100.

The wireless communication unit may perform short-range wireless communication with another electronic device. For example, the display device 100 may be connected to another electronic device through a network in accordance with communication standards such as Bluetooth, Radio Frequency Identification (RFID), infrared Data Association (IrDA), Ultra Wideband (UWB), ZigBee, and Digital Living Network Alliance (DLNA).

Moreover, the external device interface unit 135 may be connected to various set top boxes through at least one of the above various terminals in order to perform an input/output operation with a set top box.

Meanwhile, the external device interface unit 135 may receive applications or lists of applications in an adjacent external device, and then may deliver them to the controller 170 or the storage unit 140.

The network interface unit 130 may provide an interface for connecting the display device 100 to a wire/wireless network including an internet network. For example, the network interface unit 130 may include an Ethernet terminal for accessing a wired network or may be connected to a wireless network through a communication standard such as Wireless LAN (WLAN) such as Wi-Fi, Wireless broadband (Wibro), World Interoperability for Microwave Access (Wimax), and High Speed Downlink Packet Access (HSDPA).

The network interface unit 130 may transmit/receive data to/from another user or another electronic device via a connected network or another network linked to the connected network. Particularly, the network interface unit 130 may transmit some contents data stored in the display device 100 to a selected user or electronic device among users or other electronic devices pre-registered in the display device 100.

The network interface unit 130 may access a predetermined web page via a connected network or another network linked to the connected network. That is, the network interface unit 130 may access a predetermined web page via a network to transmit/receive data to/from a corresponding sever. In addition, the network interface unit 130 may receive contents or data provided from a content provider or a network operator. That is, the network interface unit 130 may receive contents such as movies, advertisements, games, VODs, and broadcast signals and information thereon, which are provided from a content provider or a network provider via a network. Also, the network interface unit 130 may receive update information and update files of a firmware provided from the network operator, and may transmit data to an internet provider, a content provider, or a network operator.

The network interface unit 130 may select and receive a wanted application from applications open to the public via a network.

The storage unit 140 may store a program for processing and controlling each signal in the controller 170, and may store the processed image, sound or data signals.

Moreover, the storage unit 140 may perform a function for temporarily storing image, sound or data signals input from the external device interface unit 135 or the network interface unit 130, and may store information on a predetermined broadcast channel through a channel memory function.

The storage unit 140 may store applications or lists of applications input from the external device interface unit 135 or the network interface unit 130.

Also, the storage unit 140 may store various platforms which will be described later.

The storage unit 140 may include at least one type storage medium of a flash memory type, a hard disk type, a multimedia card micro type, a card memory type (for example, SD or XD memory), a RAM type, and an EEPROM type. The network TV 100 may play contents files stored in the storage unit 140, such as moving image files, still image files, music files, document files, and application files, and may provide them to a user.

Although FIG. 2 shows that the storage unit 140 provided separately from the controller 170, the scope of the present disclosure is not limited to this example. The storage unit 140 may be included in the controller 170.

The user input interface unit 150 delivers a signal input by a user to the controller 170 or delivers a signal from the controller 170 to a user.

For example, the user input interface unit 150 may receive and process a control signal such as power on/off, channel selection, and screen setting from a remote controller 200 or transmit the control signal from the controller 170 to the remote controller 200 in accordance with various communication modes such as an RF communication mode or an IR communication mode.

Also, the user input interface unit 150 may deliver to the controller 170 a control signal input from a local key (not shown) such as a power key, a channel key, a volume key, and a setting key.

Also, the user input interface unit 150 may deliver to the controller 170 a control signal input from a sensing unit (not shown) for sensing a user's gesture or transmit the signal from the controller 170 to the sensing unit (not shown). In this case, the sensing unit (not shown) may include a touch sensor, an audio sensor, a position sensor, and a motion sensor.

The controller 170 may demultiplex a stream input from the tuner 110, the demodulator 120, or the external device interface unit 135, or may process demultiplexed signals in order to generate and output a signal for image or sound output.

The image signal processed in the controller 170 may be input to the display unit 180, and then may be displayed as an image corresponding to a corresponding image signal. Also, the image signal processed in the controller 170 may be input to an external output device through the external device interface unit 135.

The sound signal processed in the controller 170 may be output to the audio output unit 185 as audio. Moreover, the sound signal processed in the controller 170 may be input to an external output device through the external device interface unit 135.

Although not shown in FIG. 2, the controller 170 may include a demultiplexing unit and an image processing unit. This will be described below with reference to FIG. 3.

Also, the controller 170 may control overall operations of the network TV 100. For example, the controller 170 may control the turner 131 to tune an RF broadcast corresponding to a channel selected by a user or a pre-stored channel.

Also, the controller 170 may control the display device 100 through a user command input through the user input interface unit 150 or an internal program. Particularly, the controller 170 may access a network to download applications desired by a user or a list of applications into the network TV 100.

For example, the controller 170 controls the tuner 110 to receive a signal of a selected channel in accordance with a predetermined channel selection command received through the user input interface unit 150 and processes an image, sound, or data signal of the selected channel. The controller 170 may output channel information selected by a user together with the processed image or sound signal through the display unit 180 or the audio output unit 185.

For another example, the controller 170 may output an image or sound signal of an external device such as a camera or a camcorder, which is input through the external device interface unit 135, through the display unit 180 or the audio output unit 185 in accordance with an external device image play command received through the user input interface unit 150.

Meanwhile, the controller 170 may control the display unit 180 to display an image. For example, the controller 170 may control the display unit 180 to display a broadcast image input through the tuner 110, an external input image input through the external device interface unit 135, an image input through a network interface unit, or an image stored in the storage unit 140. In this case, an image displayed on the display unit 180 may be a still or moving image or a 2D or 3D image.

Also, the controller 170 may play contents stored in the display device 100, received broadcast contents, or external input contents input from the outside. The contents may be at least one of a broadcast image, an external input image, an audio file, a sill image, an accessed web page, and a document file.

Meanwhile, according to the embodiment of the present disclosure, the controller 170 may control the display unit 180 to display a home screen in accordance with movement to the home screen.

The home screen may include a plurality of card objects classified per content source. The card objects may include at least one of a card object representing a thumbnail list of broadcast channels, a card object representing a broadcast guide list, a card object representing a broadcast reservation list or a broadcast recording list, or a card object representing a media list of the network TV or a device connected to the network TV. The card objects may further include at least one of a card object representing a list of connected external devices or a card object representing a call-associated list.

The home screen may further include an application menu with at least one application that can be executed.

Upon receipt of a card object moving input, the controller 170 may control movement of a card object corresponding to the card object moving input on the display unit 180, or if the card object is not displayed on the display unit 180, the controller 170 may control display of the card object on the display unit 180.

Moreover, when a predetermined card object is selected from among the card objects on the home screen, the controller 170 may control display of an image corresponding to the selected card object on the display unit 180.

The controller 170 may control display of an input broadcast image and an object representing information on the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting of the network TV on the home screen.

The controller 170 may control display of a log-in object, a help object, or an exit object on a part of the home screen. Also, the controller 170 may control display of an object representing the total number of available card objects or the number of card objects displayed on the display unit 180 among all card objects, on a part of the home screen.

If a card object name in a predetermined card object of the card objects displayed on the display unit 180 is selected, the controller 170 may control the display unit 180 to display the selected card object as a full screen. Upon receipt of an incoming call in a connected external device or the network TV, the controller 170 may control focusing-on or shift of a call-related card object into the display unit 180 among the plurality of card objects.

If an application view menu item is selected, the controller 170 may control display of applications or a list of applications that are available in the network TV or downloadable from an external network. The controller 170 may control installation and execution of an application downloaded from the external network along with various user interfaces. Also, the controller 170 may control display of an image related to the executed application on the display unit 180, upon user selection.

The display unit 180 may convert a processed image signal, a processed data signal, and an OSD signal received from the controller 170 or an image signal and a data signal received from the external device interface unit 135 into RGB signals, thereby generating driving signals.

The display unit 180 may be various types of displays such as a Plasma Display Panel (PDP), a Liquid Crystal Display (LCD), an Organic Light-Emitting Diode (OLED) display, a flexible display, and a 3D display.

The display unit 180 may also be a touch screen that can be used not only as an output device but also as an input device.

The audio output unit 185 may receive a processed audio signal, e.g., a stereo signal, a 3.1-channel signal or a 5.1-channel signal, from the controller 170 and output the received audio signal as sound. The audio output unit 185 may be implemented as various types of speakers.

To sense a user gesture, the display device 100 may further include the sensing unit (not shown) that includes at least one of a touch sensor, an audio sensor, a position sensor, and a motion sensor, as described above. A signal sensed by the sensing unit may be delivered to the controller 170 through the user input interface unit 150.

The display device 100 may further include the camera unit (not shown) for capturing images of a user. Image information captured by the camera unit may be input to the controller 170.

The controller 170 may sense a user gesture from an image captured by the camera unit (not shown) or a signal sensed by the sensing unit, or by combining the captured image and the sensed signal.

The power supply unit 190 supplies a corresponding power to the network TV 100.

Particularly, the power supply unit 190 may supply a power to the controller 170, the display unit 180 for image display, and the audio output unit 185 for audio output, which may be implemented as a System On Chip (SOC).

To this end, the power supply unit 190 may include a converter (not shown) for converting Alternating Current (AC) into Direct Current (DC). If the display unit 180 is implemented as, for example, a liquid crystal panel having a plurality of backlight lamps, the power supply unit 190 may further include an inverter capable of performing Pulse Width Modulation (PWM) for luminance change or dimming driving.

The remote controller 200 transmits a user input to the user input interface unit 150. To this end, the remote controller 200 may use Bluetooth, RF communication, IR communication, UWB and ZigBee.

In addition, the remote controller 200 may receive an image signal, an audio signal or a data signal from the user input interface unit 150 and output the received signals visually, audibly or as vibrations.

The above-described display device 100 may be a fixed digital broadcast receiver capable of receiving at least one of ATSC (8-VSB) digital broadcast, DVB-T (COFDM) digital broadcast, and ISDB-T (BST-OFDM) digital broadcast.

The block diagram of the display device 100 illustrated in FIG. 1 or 2 is for one embodiment of the present disclosure. Depending upon the specifications of the display device 100 such as TV in actual implementation, the components of the display device may be combined or omitted or new components may be added. That is, two or more components are incorporated into one component or one component may be configured by being segmented into two or more components, as needed. In addition, the function of each block is described for the purpose of describing the embodiment of the present disclosure and thus specific operations or devices should not be construed as limiting the scope and spirit of the present disclosure.

Figure 3:
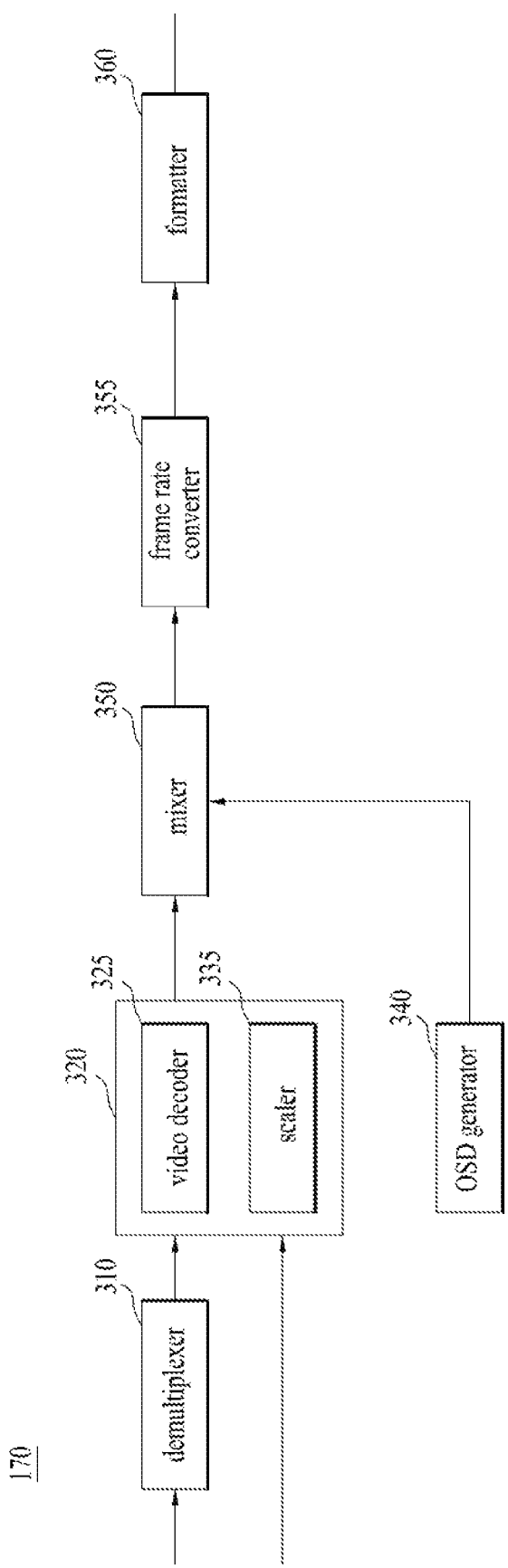
FIG. 3 is an internal block diagram illustrating a controller shown in FIG. 2.

FIG. 3 is an internal block diagram illustrating a controller shown in FIG. 2. Hereinafter, functions of the controller will be described in more detail with reference to FIGS. 3 and 2.

The controller 170 according to one embodiment of the present disclosure may include a demultiplexer 310, a video processor 320, an OSD generator 340, a mixer 350, a frame rate converter 355, and a formatter 360. The controller 170 may further include an audio processor (not shown) and a data processor (not shown).

The demultiplexer 310 demultiplexes an input stream. For example, the demultiplexer 310 may demultiplex an MPEG-2 TS into a video signal, an audio signal, and a data signal. The stream signal input by the demultiplexer 310 may be the signal output from the tuner 110, the demodulator 120 or the external device interface unit 135.

The video processor 320 may process the demultiplexed video signal. To this end, the video processor 320 may include a video decoder 325 and a scaler 335.

The video decoder 325 decodes the demultiplexed video signal and the scaler 335 scales the resolution of the decoded video signal so that the video signal can be displayed on the display unit 180.

The video decoder 325 may be provided with decoders that operate based on various standards. If the demultiplexed video signal is, for example, an MPEC-2 encoded video signal, the video signal may be decoded by an MPEC-2 decoder.

If the demultiplexed video signal is an H.264-encoded DMB or DVB-handheld (DVB-H) signal, the video signal may be decoded by an H.264 decoder.

The video signal decoded by the video processor 320 is input to the mixer 350.

The OSD generator 340 generates an OSD signal autonomously or in accordance with a user input. For example, the OSD generator 340 may generate signals by which a variety of information is displayed as graphic or text on the display 180, based on control signals received from the user input interface unit 150. The OSD signal may include various data such as a user interface screen, a variety of menu screens, widgets, icons, etc.

For example, the OSD generator 340 may generate a signal for displaying subtitles of a broadcast image or Electronic Program Guide (EPG)-based broadcasting information.

The mixer 350 may mix the OSD signal generated by the OSD generator 340 with the decoded video signal processed by the video processor 220. The mixed signal is provided to the formatter 360. As the decoded broadcast video signal or the external input signal is mixed with the OSD signal, an OSD may be overlaid on the broadcast image or the external input image.

The frame rate converter (FRC) 355 may change the frame rate of an input image. For example, a frame rate of 60 Hz is converted into a frame rate of 120 or 240 Hz. When the frame rate is to be changed from 60 Hz to 120 Hz, a first frame may be inserted between the first frame and a second frame, or a predicted third frame may be inserted between the first and second frames. If the frame rate is to be changed from 60 Hz to 240 Hz, three identical frames or three predicted frames may be inserted between the first and second frames. It is also possible to maintain the frame rate of the input image without frame rate conversion.

The formatter 360 changes the format of the signal received from the frame rate converter 355 to be suitable for the display unit 180. For example, the formatter 360 may convert a received signal into an RGB data signal. The RGB signal may be output in the form of a Low Voltage Differential Signal (LVDS) or mini-LVDS.

The audio processor (not shown) of the controller 170 may process the demultiplexed audio signal. For audio signal processing, the audio processor (not shown) may have a plurality of decoders.

If the demultiplexed audio signal is a coded audio signal, the audio processor (not shown) of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor (not shown) of the controller 170 may also adjust the base, treble or volume of the audio signal.

The data processor (not shown) of the controller 170 may process the demultiplexed data signal. For example, if the demultiplexed data signal is an encoded signal, the data processor may decode the encoded data. The encoded data signal may be EPG (Electronic Program Guide) information that includes broadcasting information specifying the start time, end time, etc. of a broadcast program broadcasted by each channel. Examples of an EPG include ATSC-Program and System Information Protocol (PSIP) information and DVB-Service Information (SI).

ATSC-PSIP information or DVB-SI may be included in the header of the aforementioned stream, i.e., a 4-byte header of an MPEG-2 TS.

The block diagram of the controller 170 illustrated in FIG. 3 is an embodiment of the present disclosure. The other modules may be added to the controller 170 or some of the modules illustrated in FIG. 3 may be omitted depending on the need of the person skilled in the art.

Figure 4:
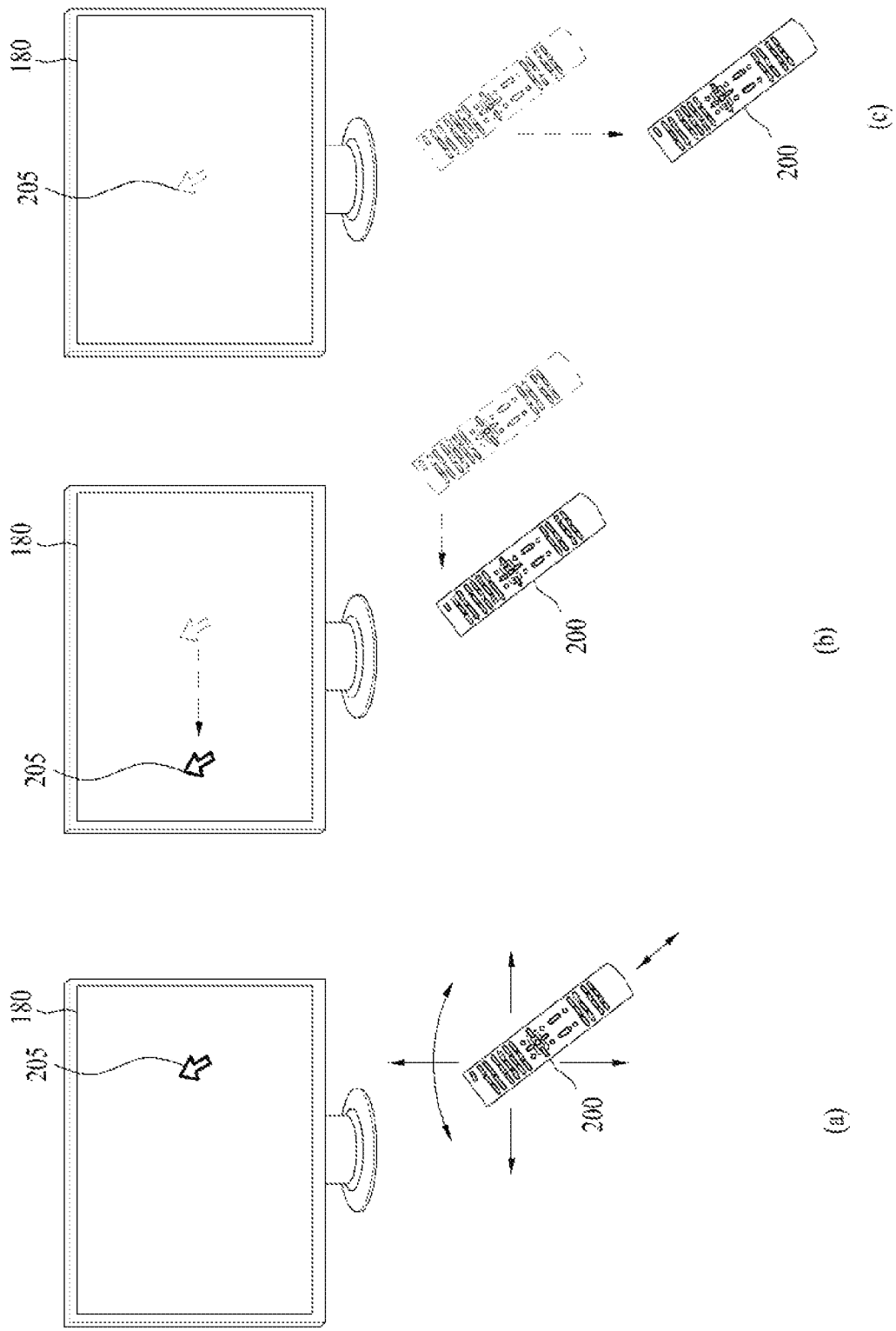
FIG. 4 is a diagram illustrating a method for controlling a remote controller for controlling a display device according to one embodiment of the present disclosure.

FIG. 4 is a diagram illustrating a method for controlling a remote controller for controlling a display device according to one embodiment of the present disclosure. Hereinafter, an external appearance of a remote controller for controlling a display device according to one embodiment of the present disclosure will briefly be described with reference to FIG. 4.

As shown in FIG. 4(a), a pointer 205 corresponding to the remote controller 20 is displayed on the display unit 180.

A user may move or rotate the remote controller 200 up and down, from left to right (FIG. 4(b)), and from forward to backward (FIG. 4(c)). The pointer 205 displayed on the display unit 180 of the display device corresponds to movement of the remote controller 200.

The remote controller 200, as shown, may be referred to as a spatial remote controller because the corresponding pointer 205 moves and is displayed in accordance with movement on a 3D space.

FIG. 4(b) illustrates that the pointer 205 displayed on the display unit 180 of the display device moves to a left side correspondingly to the remote controller 200 if a user moves the remote controller 200 to the left side.

Information on movement of the remote controller 200, which is sensed by a sensor of the remote controller 200, is transmitted to the display device. The display device may calculate a coordinate of the pointer 205 from the information on movement of the remote controller 200. The display device may display the pointer 205 to correspond to the calculated coordinate.

FIG. 4(c) illustrates that a user moves the remote controller 200 to be away from the display unit 180 in a state that the user pushes a specific button in the remote controller 200. Therefore, a selection area in the display unit 180 corresponding to the pointer 205 may be displayed to be enlarged by zoom-in. On the contrary, if a user moves the remote controller 200 to be close to the display unit 180, a selection area in the display unit 180 corresponding to the pointer 205 may be displayed to be downsized by zoom-out. Meanwhile, if the remote controller 200 becomes far away from the display unit 180, the selection area may be zoom-out, and if the remote controller 200 becomes close to the display unit 180, the selection area may be zoom-in.

In a state that a user pushes a specific button in the remote controller 200, recognition of up and down and left and right movement may be excluded. That is, if the remote controller 200 moves to be away from or close to the display unit 180, up/down and left/right movement may not be recognized and forward and backward movement may only be recognized. In a state that a user does not push a specific button in the remote controller 200, the pointer 205 only moves in accordance with up and down and left and right movement of the remote controller 200.

A moving speed or moving direction of the pointer 205 may correspond to a moving speed or moving direction of the remote controller 200.

In this specification, the pointer means an object displayed on the display unit 180 to correspond to the operation of the remote controller 200. Therefore, examples of the pointer 205 include various shapes of objects in addition to an arrow shape as shown. For example, the pointer 205 may be a concept that includes a dot, a cursor, a prompter, a thick outline, etc. The pointer 205 may not only be displayed to correspond to any one point of a horizontal axis and a vertical axis on the display unit 180 but also be displayed to correspond to a plurality of points such as line and surface.

Figure 5:
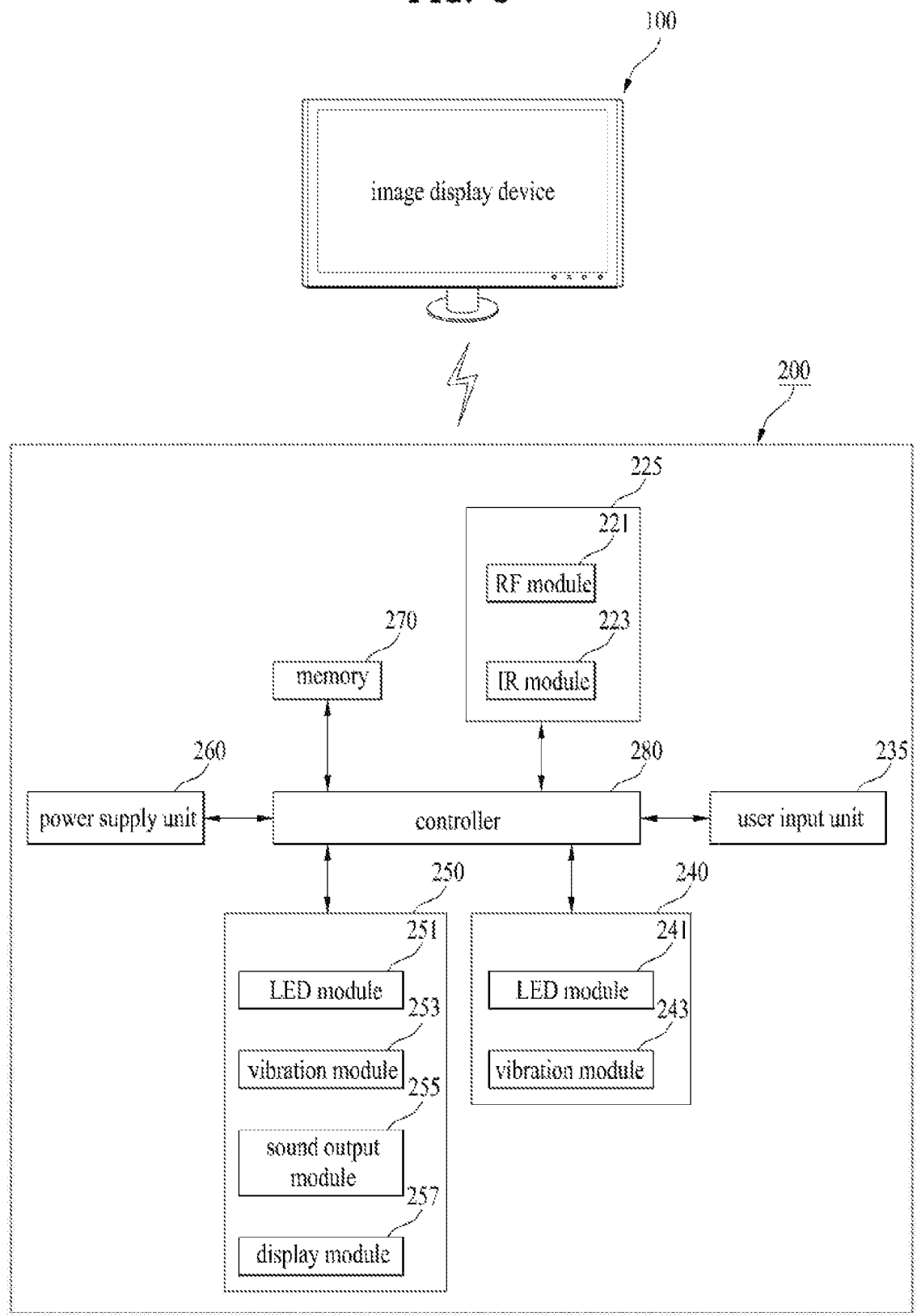
FIG. 5 is an internal block diagram illustrating a remote controller for controlling a display device according to one embodiment of the present disclosure.

FIG. 5 is an internal block diagram illustrating a remote controller for controlling a display device according to one embodiment of the present disclosure. Hereinafter, an internal module of a remote controller for controlling the display device according to one embodiment of the present disclosure will be described in detail with reference to FIG. 5.

Referring to FIG. 5, the remote controller 200 may include a wireless communication unit 225, a user input unit 235, a sensor unit 240, an output unit 250, a power supply unit 260, a memory 270, and a controller 280.

The wireless communication unit 225 transmits/receives signals to/from an arbitrary one of the display devices according to the above-mentioned embodiments of the present disclosure.

In this embodiment, the remote controller 200 may include an RF module 221 for transmitting/receiving signals to/from the display device 100 in accordance with the RF communication standards. Also, the remote controller 200 may include an IR module 223 for transmitting/receiving signals to/from the display device 100 in accordance with the IR communication standards.

In this embodiment, the remote controller 200 transmits signals containing information on a movement of the remote controller 200 to the display device 100 through the RF module 221.

Moreover, the remote controller 200 may receive signals transmitted from the display device 100 through the RF module 221. Also, if necessary, the remote controller 200 may transmit a command on power on/off, channel change, and volume change to the display device 100 through the IR module 223.

The user input unit 235 may be configured as a keypad, a button, a touch pad, or a touch screen. A user may manipulate the user input unit 235 to input a command related to the display device 100 to the remote controller 200. If the user input unit 235 includes a hard key button, a user may input a command related to the display device 100 to the remote controller 200 through the push operation of the hard key button. If the user input unit 235 includes a touch screen, a user may touch a soft key of the touch screen to input a command related to the display device 100 to the remote controller 200. Also, the user input unit 235 may include various kinds of input means manipulated by a user, for example, a scroll key and a jog key, and this embodiment does not limit the scope of the present disclosure.

The sensor unit 240 may include a gyro sensor 241 or an acceleration sensor 243. The gyro sensor 241 may sense information on a movement of the remote controller 200.

For example, the gyro sensor 241 may sense information on an operation of the remote controller 200 on the basis of x, y, and z axes. The acceleration sensor 243 may sense information on a moving speed of the remote controller 200. The remote controller 200 may further include a distance measurement sensor to sense a distance with respect to the display unit 180.

The output unit 250 may output video or audio signals corresponding to a manipulation of the user input unit 235 or corresponding to signals transmitted from the display device 100. A user may recognize whether the user input unit 235 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

The power supply unit 260 supplies a power to the remote controller 200. If the remote controller 200 does not move for a predetermined time, the power supply unit 260 stops the power supply, so that power waste may be reduced. The power supply unit 260 may resume the power supply if a predetermined key provided in the remote controller 200 is manipulated.

The memory 270 may store various kinds of programs and application data necessary for a control or operation of the remote controller 200. If the remote controller 200 transmits/receives signals wirelessly through the display device 100 and the RF module 221, the remote controller 200 and the display device 100 transmit/receive signals through a predetermined frequency band. The controller 280 of the remote controller 200 may store, in the memory 270, information on a frequency band for wirelessly transmitting/receiving signals to/from the display device 100 paired with the remote controller 200 and refer to it.

The controller 280 controls general matters related to a control of the remote controller 200. The controller 280 may transmit a signal corresponding to a predetermined key manipulation of the user input unit 235 or a signal corresponding to a movement of the remote controller 200 sensed by the sensor unit 240 to the display device 100 through the wireless communication unit 225.

Figure 6:
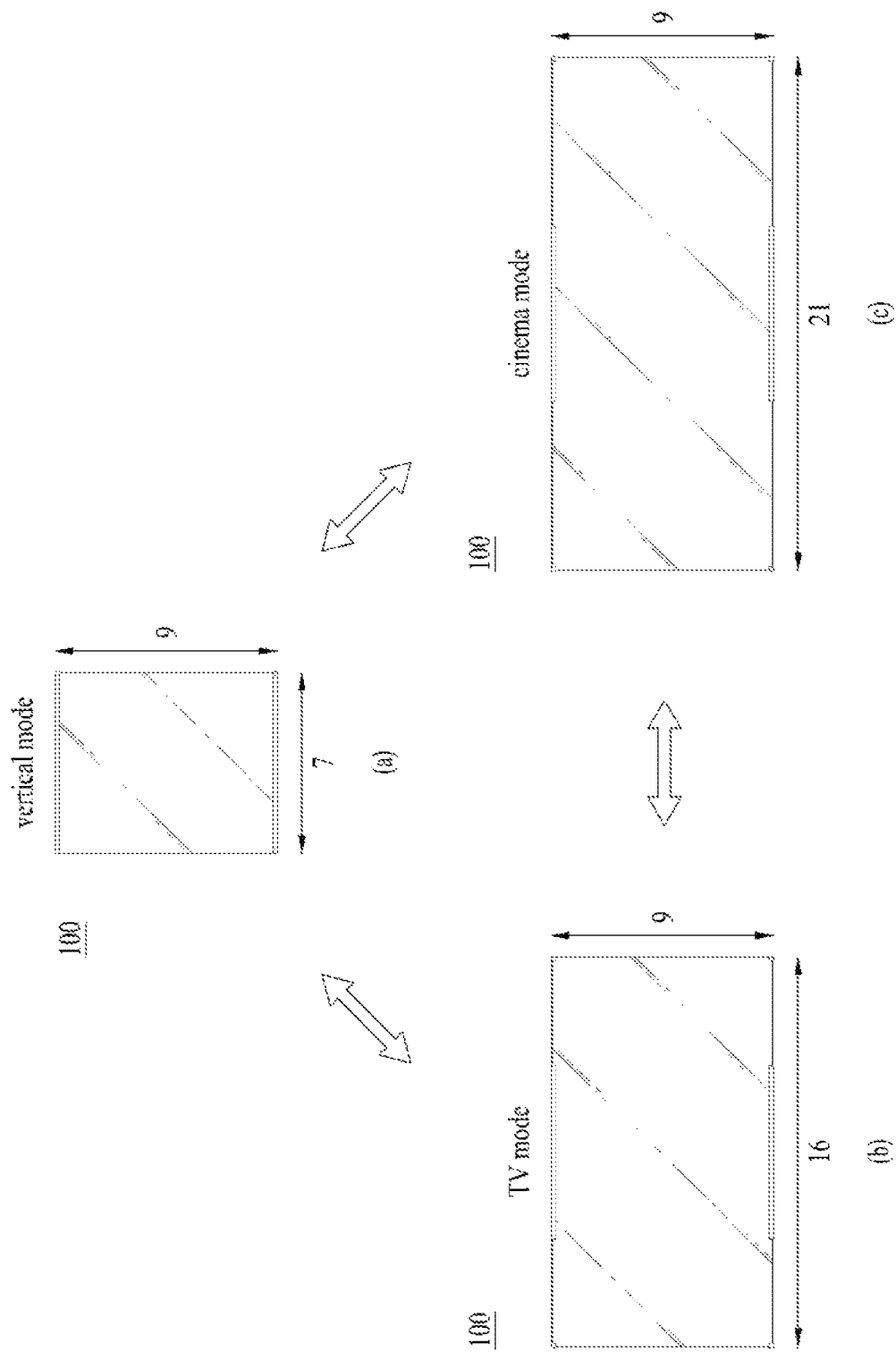
FIGS. 6(a), 6(b) and 6(c) briefly illustrate three output modes of a display device according to the present disclosure.

FIGS. 6(a), 6(b) and 6(c) briefly illustrate three output modes of a display device according to the present disclosure.

The display device 100 may include a plurality of output modes. The display device 100 may have different screen output areas in accordance with each output mode as shown in FIGS. 6(a), 6(b) and 6(c).

The display device 100 of the present disclosure may variably implement the plurality of output modes. This means that the display device forms a variable screen output area. The display device 100 may have a screen output area as shown in FIG. 6(b) or a screen output area as shown in FIG. 6(c), as the screen output area is extended in FIG. 6(a), or vice versa.

For example, the display device may have a screen output area of an aspect ratio of 7:9 as a vertical mode in FIG. 6(a), may have a screen output area of an aspect ratio of 16:9 as a TV mode in FIG. 6(b), and may have a screen output area of an aspect ratio of 21:9 as a cinema mode in FIG. 6(c).

Although three output modes are described in this embodiment, a screen output area of an aspect ratio different from the drawing aspect ratio may be provided.

The output mode may be varied depending on a property of a content to be output or varied depending on a user's selection.

In all embodiments, which will be described later, as well as this embodiment, the screen output area of the display device 100 is enlarged or downsized in a horizontal direction unless mentioned separately. However, the screen output area of the display device 100 is not limited to this example, and may be enlarged or downsized in a vertical direction within the range against the property.

FIGS. 7(a), 7(b) and 7(c) briefly illustrate three output modes of a display device according to the present disclosure.

Figure 7:
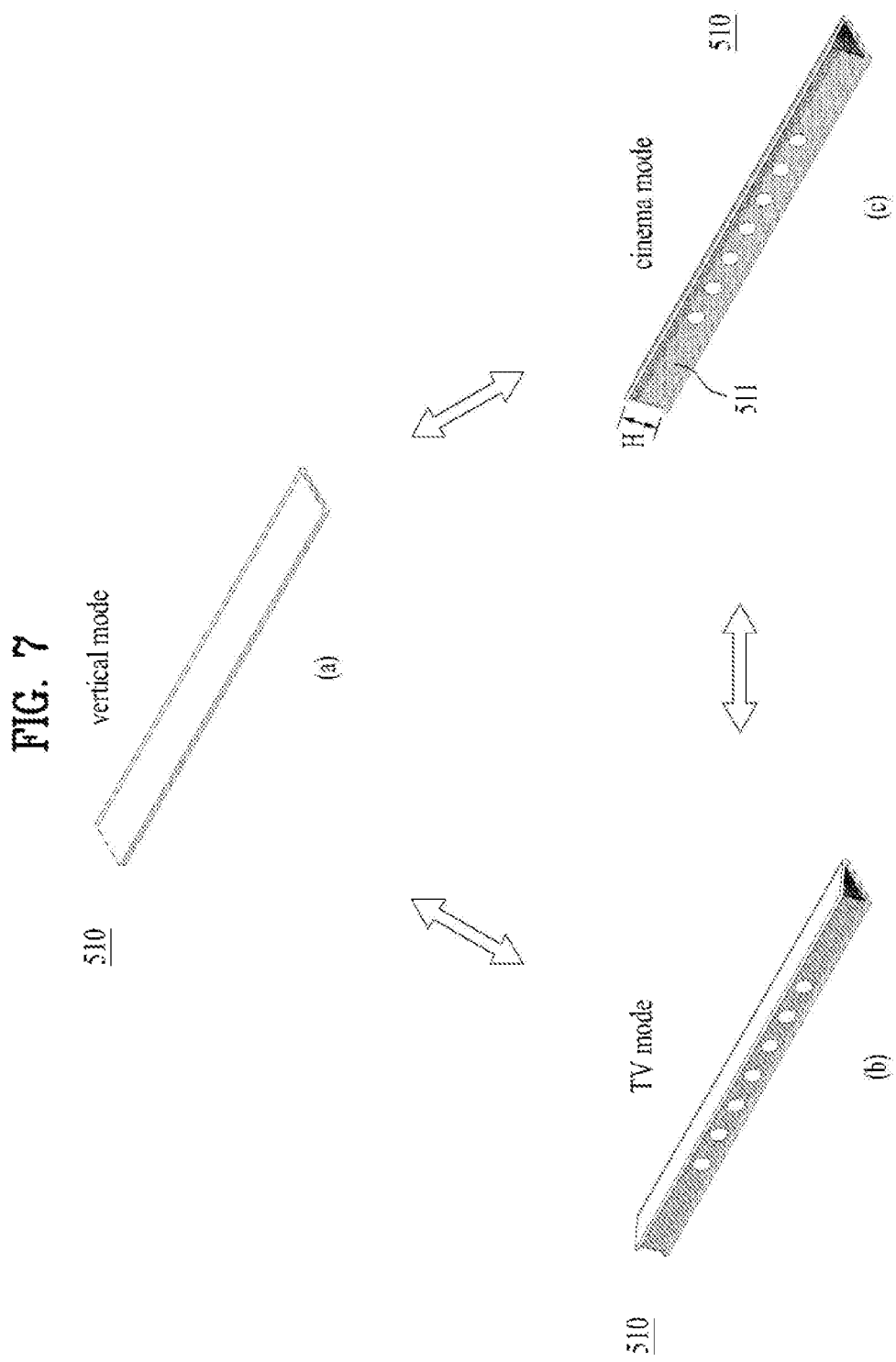
FIGS. 7(a), 7(b) and 7(c) briefly illustrate three output modes of a display device according to the present disclosure.

The display device 100 may include a speaker 510 for outputting a sound. As shown in FIG. 7, the speaker 510 may include a separate element physically differentiated from the screen output area of the display device 100. The speaker 510 may be connected with a sound output area of the display device 100 in a wireless or wire mode.

The speaker 500 may include an output unit 511 that is an area to which a sound is directly output. An area of the output unit 511 may be variable. Particularly, an up and down width H of the output unit 511 is varied as shown in FIG. 7, whereby the screen output area may be varied. As the screen output area of the output unit 511 becomes greater, the sound output of the speaker 510 may become greater.

The speaker 510 may vary the sound output area of the output unit 511 depending on the output modes. The speaker 510 may have the smallest sound output area in the vertical mode, the greater sound output area than that of the vertical mode in the TV mode, and the greater sound output area than that of the TV mode in the cinema mode. That is, the screen output area of the display device 100 and the sound output area of the speaker 510 may be increased or reduced in the same direction in accordance with each output mode.

Figure 8:
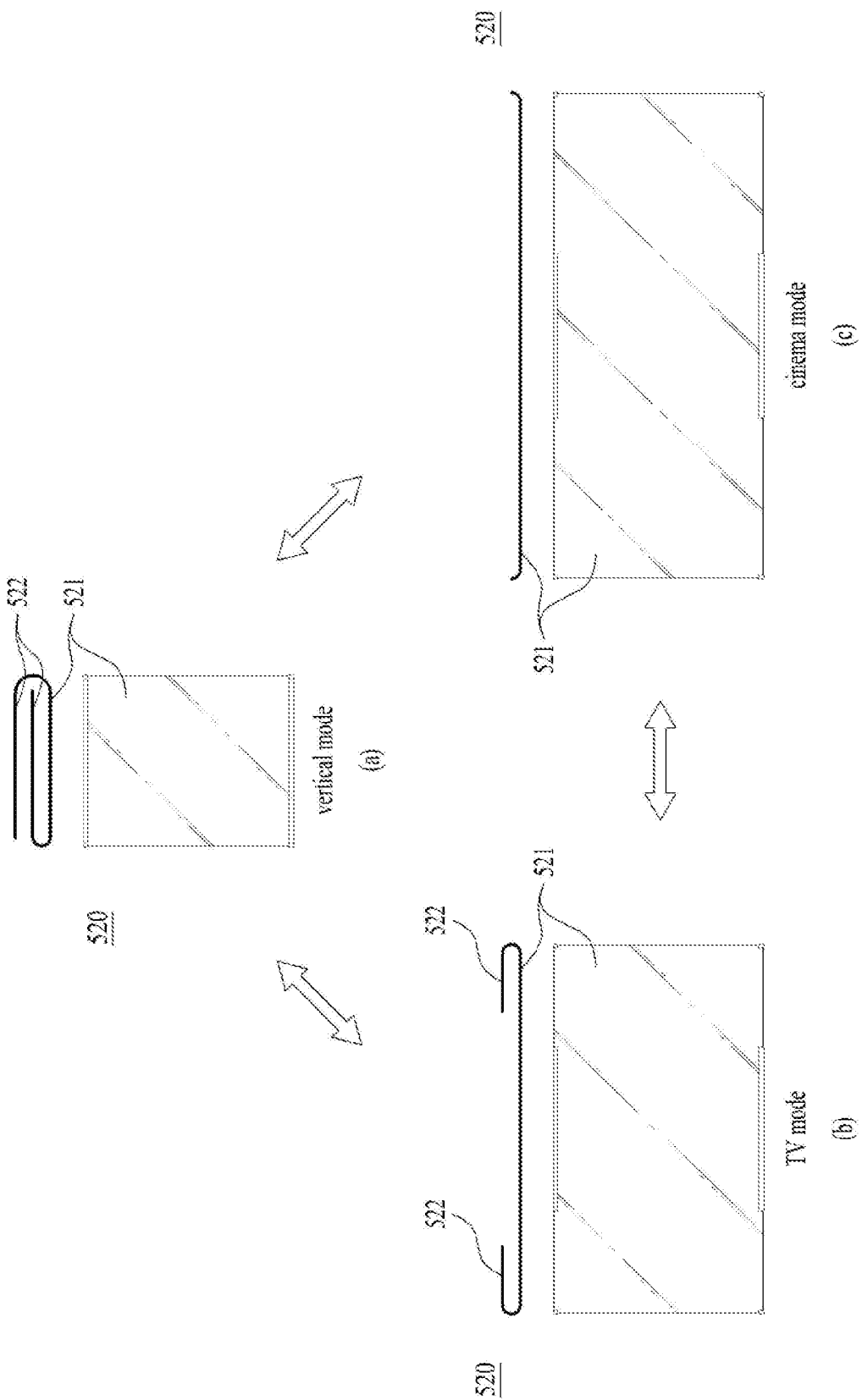
FIG. 8 is a front and upper brief view illustrating a flexible display based on each output mode of a display device of the present disclosure.

FIG. 8 is a front and upper brief view illustrating a flexible display 520 based on each output mode of a display device of the present disclosure.

The display device of which output area 521 is variable may include a body forming a control part and a flexible display 520 provided on a front surface of the body.

The flexible display 520 may vary the output area 521 in accordance with an output mode of the aforementioned display device. Since a non-output area 522 may be provided on a rear surface of the output area 521 by being wound in at least one end of the output area 521.

A left and right width of the output area 521 of the flexible display 520 may be varied to correspond to a left and right width of the body. That is, in accordance with the output mode, the body may be enlarged or downsized in a left and right direction, and the output area 521 of the flexible display 520 may also be enlarged or downsized in a left and right direction, whereby a ratio of the output area 521 and the non-output area 252 is varied.

Figure 9:
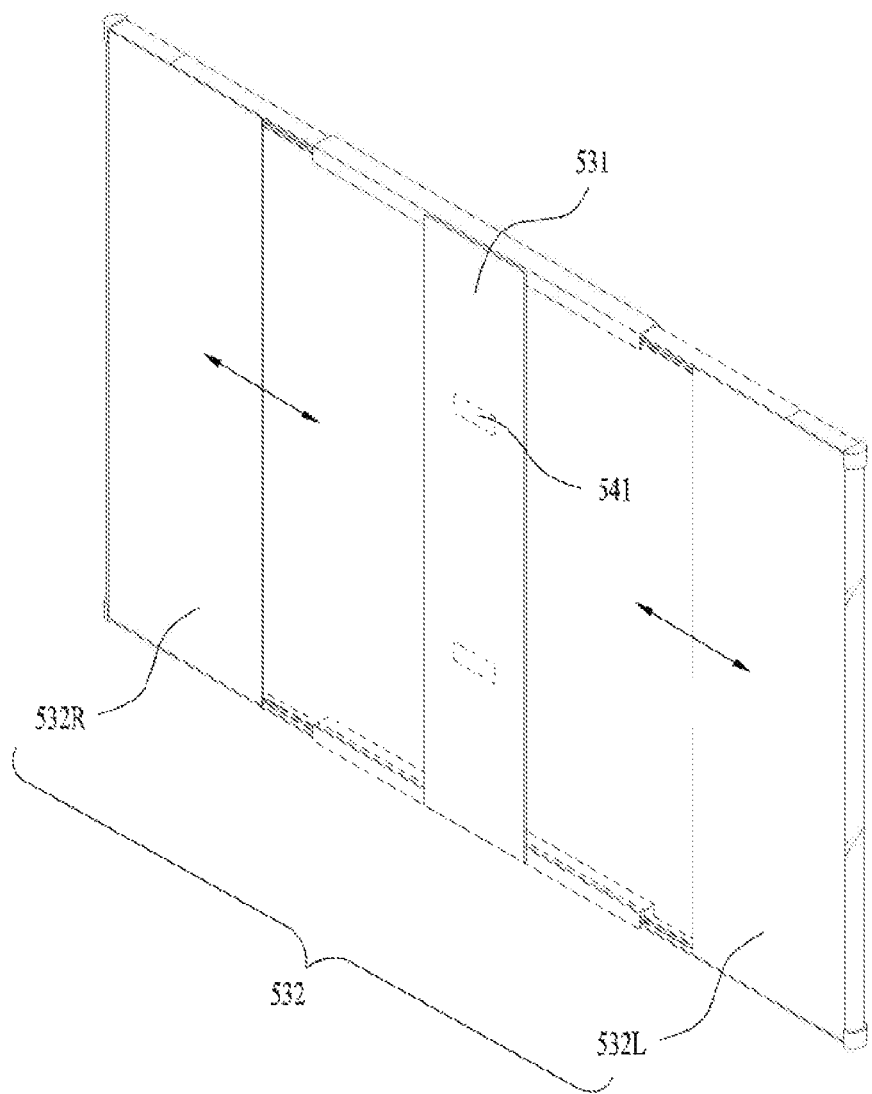
FIG. 9 is a rear brief view of a display device according to the present disclosure.

FIG. 9 is a rear brief view of a display device according to the present disclosure.

As described above, the body 530 of the display device may be enlarged or downsized in a left and right direction. Enlargement or downsizing of the body 530 of the display device is implemented by mutual behavior of a fixed body 531 and an extended body 532.

The fixed body 531 may include a fixed bracket 541 fixed to a wall. The fixed body 531 may be fixed to the wall by the fixed bracket 541 and thus does not move relatively.

The extended body 532 may be coupled to at least one corner of the fixed body 531 to implement extension or downsizing of the front area of the body 530. For example, the extended body 532 may be slid in a left and right direction with respect to the fixed body 531.

The fixed body 531 forms a first support surface provided with the flexible display on the front surface of the display device, and the extended body 532 forms a second support surface provided with the flexible display on the front surface of the display device.

If it is assumed that the extended body 532 is slide toward an inner side of the fixed body 531 and inserted into the fixed body 531 or slide toward an outer side of the fixed body 531 and ejected from the fixed body 531, the area of the first support surface may be fixed and the area of the second support surface may be varied depending on an insertion or ejection level.

The extended body 532 may be provided at one of a left side and a right side of the fixed body 531, or may be provided at each of the left and right sides of the fixed body 531. For balance of the display device, it is preferable that the extended body 532 is provided at each of the left and right sides of the fixed body 531.

The left extended body 532L is coupled to the right side of the fixed body 531, and the right extended body 532R is coupled to the right side of the fixed body 531.

Figure 10:
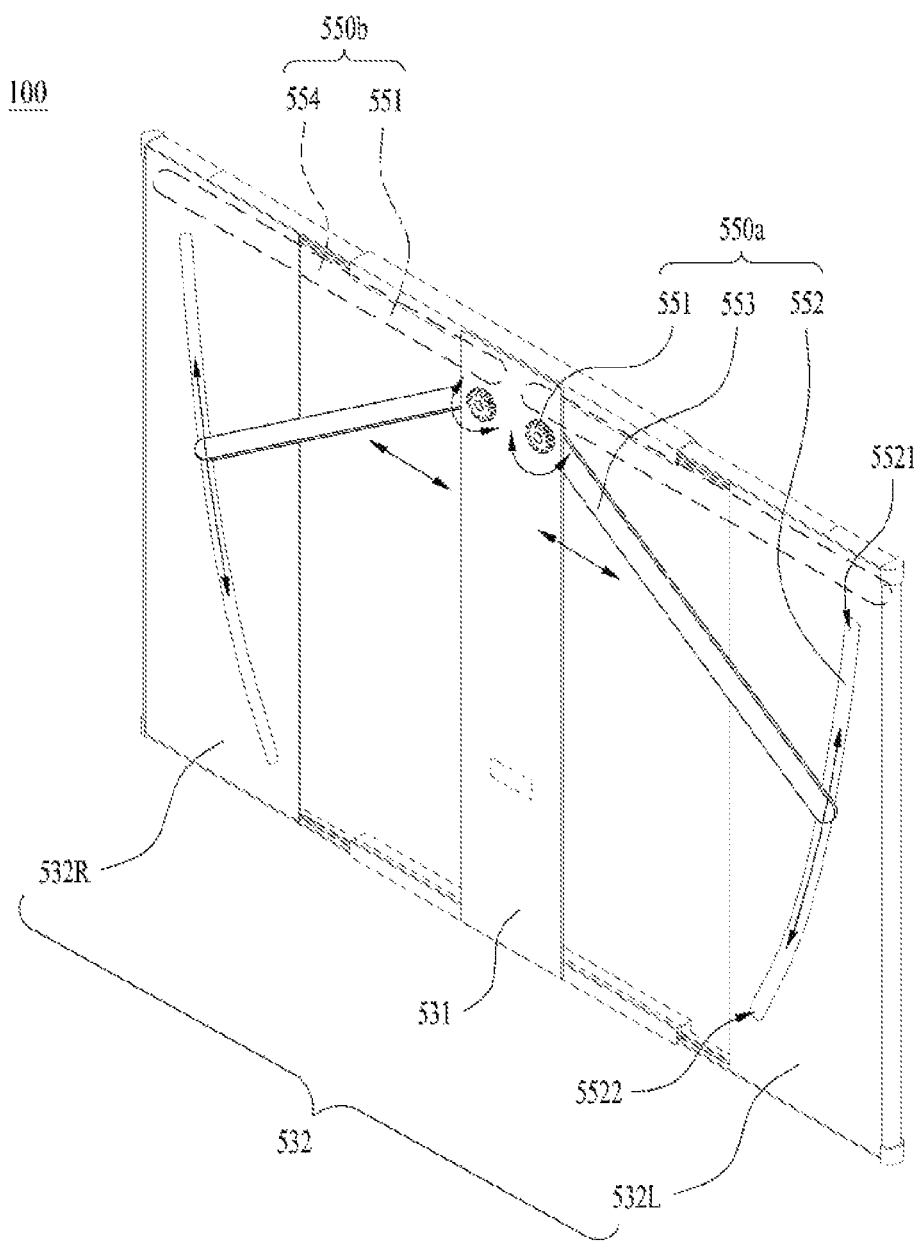
FIG. 10 illustrates s a rear surface of a display device according to the present disclosure.

FIG. 10 illustrates s a rear surface of a display device 100 according to the present disclosure.

Hereinafter, a detailed behavior method of the body which performs behavior of FIG. 9 will be described. Therefore, a description will be given based on that the extended body 532 is slid with respect to the fixed body 531 and thus the body is downsized or enlarged as described in FIG. 9.

The driving unit 550 slides the extended body 532 with respect to the fixed body 531, thereby generating a physical force for enlarging or downsizing the output area.

The controller may serve to electrically control the driving unit 550 to generate a force.

The driving unit 550 may include a motor 551 for providing a slide force of the extended body 532. The driving unit 550 may include a rotational driving unit 550a or a translational driving unit 550b. The rotational driving unit 550a and the translational driving unit 550b are classified in accordance with a delivery manner of a force for behaving the extended body 532. The rotational driving unit 550a may switch a rotational force of a rotational arm 553 to a force for a slide direction of the extended body 532, and the translational driving unit 550b may directly deliver the force for the slide direction of the extended body 532.

As the case may be, the rotational driving unit 550a and the translational driving unit 550b may be implemented simultaneously, or any one of the rotational driving unit 550a and the translational driving unit 550b may be implemented. If the rotational driving unit 550a and the translational driving unit 550b are implemented simultaneously, the extended body 532 may improve durability and perform stable behavior in that the force for sliding the extended body 532 may be dispersed appropriately when the rotational driving unit 550a and the translational driving unit 550b are implemented simultaneously.

The motor 551 of the rotational driving unit 550a may be provided in the fixed body 531 to form an output area, that is, a rotary shaft vertical to the front surface of the body. One end 5531 of the rotary arm 553 is fixed to the motor 551 of the rotational driving unit 550a.

A rail unit 552 is provided in the extended body 532 to form an area to which the other end 5532 of the rotary arm 553 is fixed and then moves along a rail.

Since distances from a center of a rotary shaft of the rotational driving unit 550a to each point of rails of the rail unit 552 are different, the extended body 522 moves with respect to the fixed body 531 to maintain a length of the rotary arm 553 in accordance with rotation of the rotary arm 553.

The rails of the rail unit 552 may form a curve such that a curvature center may be located toward the rotational driving unit 550a. If the motor 551 of the rotational driving unit 550a is provided at an upper end 5521 of the fixed body 531, the distance from one point of the rail upper end 5521 of the rail unit 552 to the rotational driving unit 550a may be shorter than the distance from one point of the rail lower end 5522 of the rail unit 552 to the rotational driving unit 550a.

Therefore, if the other end 5532 of the rotary arm 553 is located at one point of the rail upper end 5521, the extended body 532 is slid toward the outside of the body 530 to enlarge the output area, and if the other end 5532 of the rotary arm 553 is located at one point of the rail lower end 5522, the extended body 532 is slid toward the inside of the body 530 to downsize the output area.

Since the translational driving unit 550b is driven to be engaged with the motor 551 having a rotary shaft parallel with the first support surface and a first linear gear 554 provided along a slide direction, the extended body 532 is slid toward the outside with respect to the fixed body 531 during rotation of the motor 551 in one direction, and the extended body 532 is slide toward the inside with respect to the fixed body 531 during rotation of the motor 551 in the other direction, whereby the output area is downsized.

Figure 11:
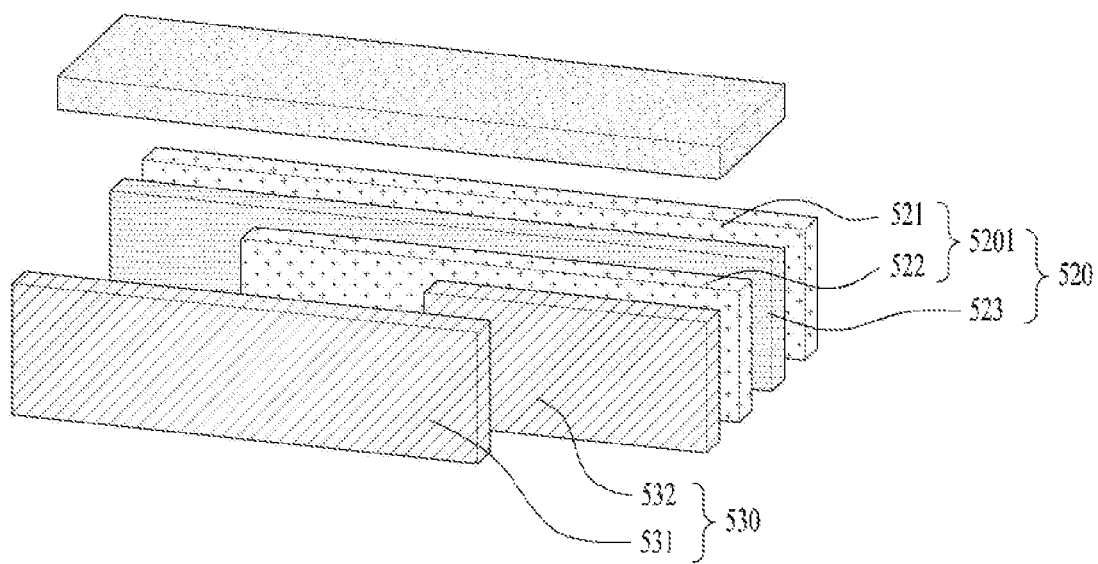
FIG. 11 is a sectional view illustrating one area of a display device according to the present disclosure.
Figure 12:
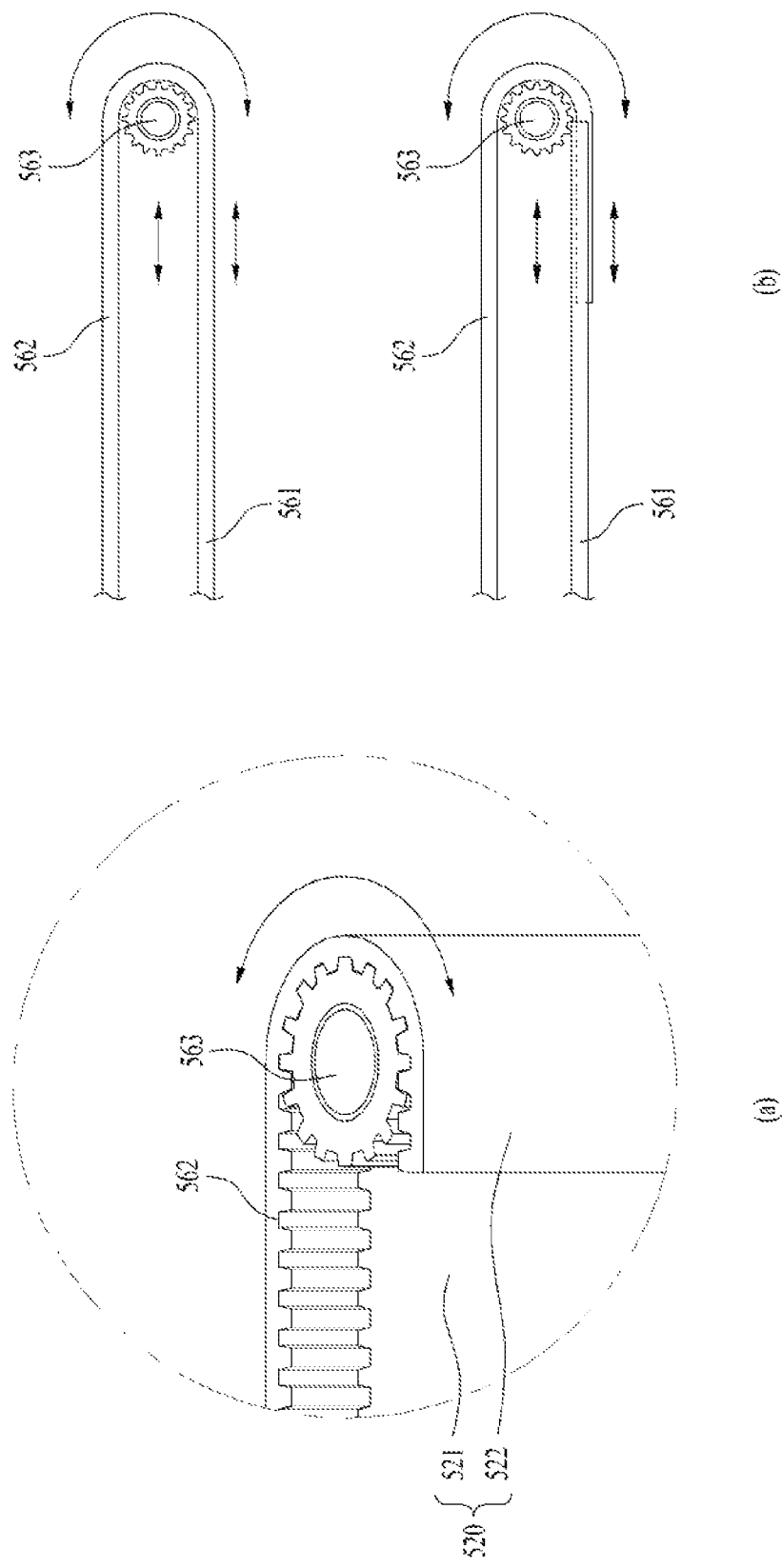
FIG. 12(a) is a rear perspective view illustrating one area of a flexible display according to the present disclosure.
FIG. 12(b) is an upper view illustrating a brief outline of an area of FIG. 12(a).

FIG. 11 is a sectional view illustrating one area of a display device 100 according to the present disclosure, FIG. 12(a) is a rear perspective view illustrating one area of a flexible display 520 according to the present disclosure, and FIG. 12(b) is an upper view illustrating a brief outline of an area of FIG. 12(a).

As the body 530 is enlarged or downsized by sliding, at least one area of the flexible display 520 is wound on the rear surface of the body 530 to form the same area as the body 530.

The flexible display 520 may include a display panel 5201 that forms the output area 521 and the non-output area 530, and a display support 523 that supports the display panel 5201.

The display support 523 may support the display panel 5201 which is flexible, to prevent the display panel 5201 from being unintentionally crushed or bent and output to be unfolded.

The display support 523 may be provided between the output area 521 of the flexible display 520 and the body 530 to support eh rear surface of the output area 521 of the flexible display 520. The non-output area 522 of the flexible display 620 may be provided to be wound on the rear surface by surrounding at least one corner of the display support 523.

A guide may serve to allow the flexible display 520 to surround and be wound on the display support 523, thereby downsizing the output area 521 or allow the non-output area 522 of the flexible display which is wound, to be unwound, thereby enlarging the output area 521.

A delivery unit delivers a force that may wind or unwind the flexible display 520 by means of enlarging or downsizing behavior of the body 530.

A body 530 may have a second pinion gear 561 provided in a slide direction, and the flexible display 520 may also have a third pinion gear 562 provided in the slide direction. The third pinion gear 562 controls a winding level of the display panel. The second pinion gear 561 may be made of the same member as the first pinion gear if necessary.

A transmission gear 563 is simultaneously engaged with the second pinion gear 561 and the third pinion gear 562 and transmits a force acting on the second pinion gear 561 to the third pinion gear. Behavior of the third pinion gear 562 allows the flexible display 520 to be wound or unwound on the display support 523.

The third pinion gear 562 has rigidity to behave to be engaged with the transmission gear 563 and needs to be bent equally with respect to an area where the flexible display 520 is bent.

The second pinion gear 561 and the third pinion gear 562 may respectively be provided at upper and lower ends of the display device 100 to transmit a sufficient force to the flexible display 520.

Figure 13:
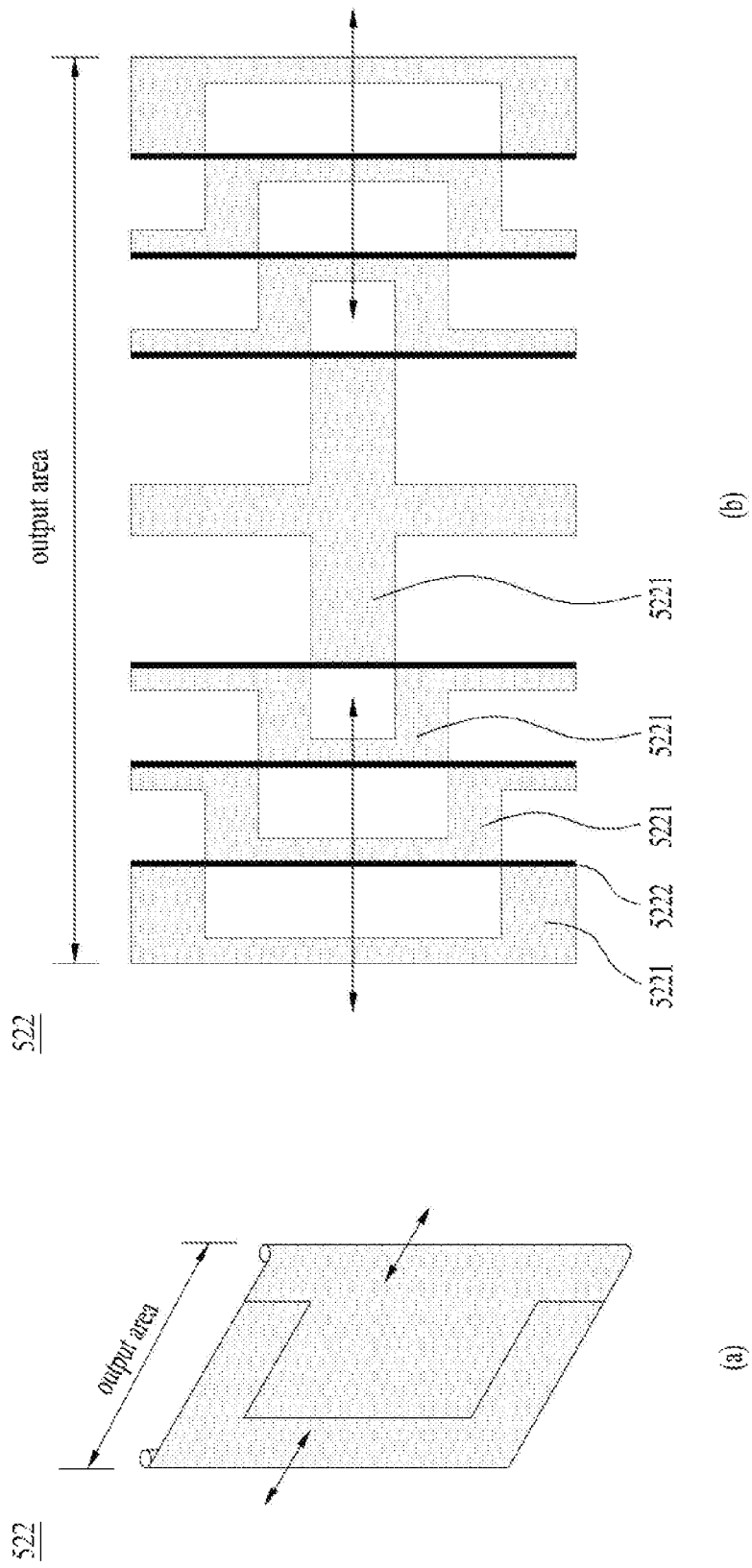
FIGS. 13(a) and 13(b) are conceptual views illustrating a display support according to the present disclosure before and after the display support is extended.

FIGS. 13(a) and 13(b) are conceptual views illustrating a display support 522 according to the present disclosure before and after the display support 522 is extended.

In order to make sure of rigidity for the entire output area of the flexible display, it is preferable that a width of the display support 522 is enlarged or downsized to correspond to a width of the output area of the flexible display. The display support 522 may variably be enlarged or downsized in the state of FIGS. 13(a) and 13(b). The display support 522 may be comprised of a plurality of frames 5221 each of which is widened during enlargement to form one layer, which makes sure of a width, without an empty space during full downsizing as shown in FIG. 13(a).

A mutual interval of the plurality of frames 5221 may be varied to control a ratio of the output area and the non-output area. The frames 5221 at both ends of the plurality of frames 5221 may correspond to both ends of the output area of the display panel.

The display support 522 may be enlarged or downsized to have the same width as both sides of the body in a slide direction.

The display support 522 may be enlarged to a maximum range, whereby adjacent boundary areas may be connected with each other even in the case that the respective frames 5221 are spaced apart from each other. In order to prevent the adjacent frames 5221 from being spaced apart from each other, the connected boundary areas may be jointed to each other by a joint 5222. The joint 5222 may be provided in a vertical direction of an enlargement or downsizing direction of the display support 522.

Figure 14:
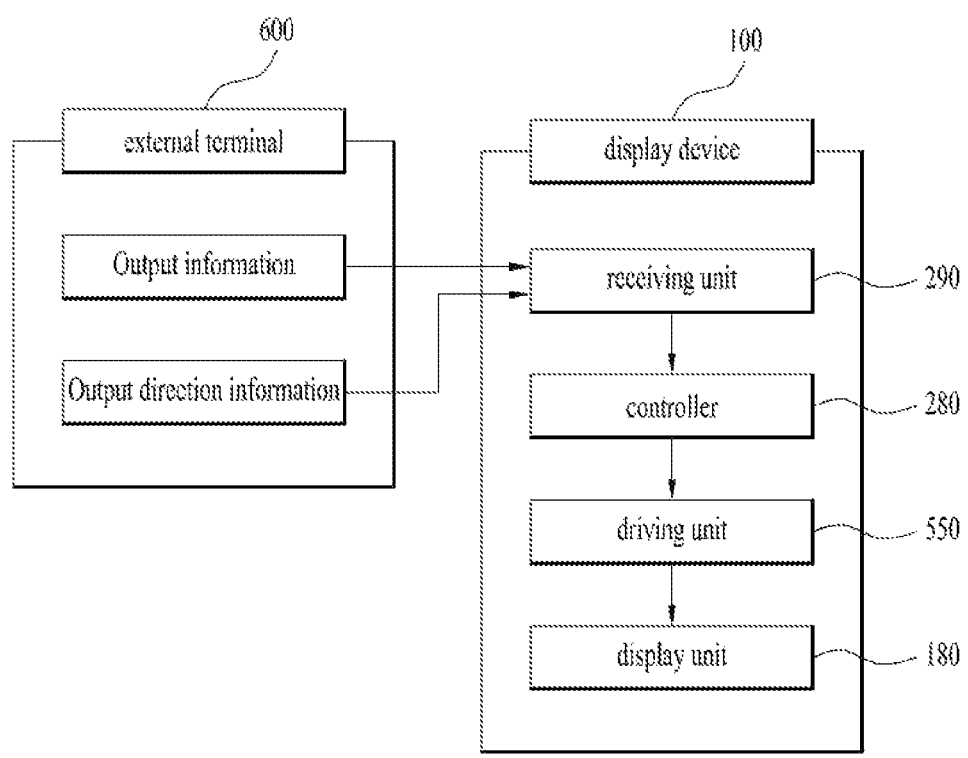
FIG. 14 is a block conceptual view illustrating a display device according to the present disclosure and an external terminal.
Figure 15:
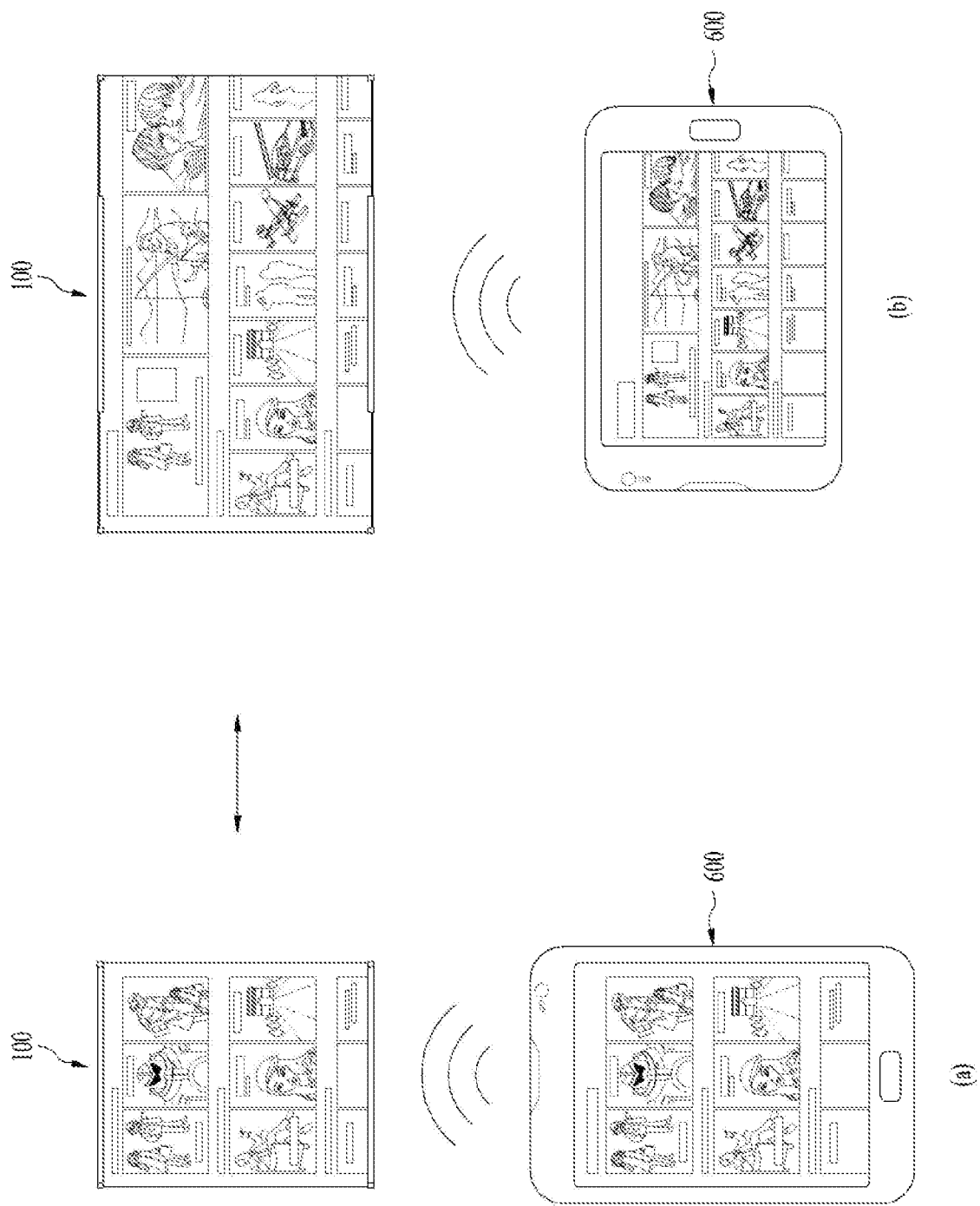
FIG. 15 illustrates an example of a display device according to the present disclosure and an external terminal.

FIG. 14 is a block conceptual view illustrating a display device 100 according to the present disclosure and an external terminal 600, and FIG. 15 illustrates an example of a display device 100 according to the present disclosure and an external terminal 600. For convenience of description, a description will be given with reference to FIGS. 14 and 15 together.

The display unit 180 of the aforementioned display device 100 has an output area that may be enlarged or downsized with respect to at least one of four corners. An enlargement or downsizing level of the output area may be varied depending on a state of the connected external terminal 600. The output area may respectively be formed at left and right sides of the display unit 180.

This embodiment may be applied to the case that the connected external terminal 600 is subjected to mirroring with respect to the display device 100 and its screen is output to the display device 100 as it is.

A receiving unit 290 of the display device 100 may receive screen information and output direction information of the external terminal 600 from the external terminal 600 connected by mirroring. The receiving unit 290 may include a wireless communication unit or a wire communication unit, and transmits or receives a signal having information in a wireless or wire mode. The received screen information may be output to the display unit 180.

The screen information may include background information which is executed and executable additional information as well as an image of information which is currently output from the external terminal 600. The output direction information may mean a direction of an image which is currently output from the external terminal 600. If the image of the external terminal 600 is output in a vertical mode, the external terminal 600 has portrait output direction information, and if the image of the external terminal 600 is output in a horizontal mode, the external terminal 600 has landscape output direction information.

The driving unit 550 means an element that provides a physical force to allow the output area of the display device 100, particularly a variable area to be enlarged or downsized.

The controller 280 of the display device 100 controls the driving unit 550 in accordance with the received output direction information of the external terminal 600.

For example, the display device 100 may control the output area of the display device 100 to be output at the same screen ratio as the screen ratio of the external terminal 600. Therefore, the display device 100 may maximize a clean external appearance and space utility by allowing the non-output area from which an image is not output, not to be visible from the front surface.

If the external terminal 600 is a portrait state as shown in FIG. 15(a), a left and right width of the display device 100 may be downsized, and if the external terminal 600 is a landscape state as shown in FIG. 15(b), a left and right width of the display device 100 may be enlarged.

The display device 100 may be enlarged or downsized continuously depending on output direction information of the external terminal 600. That is, if the screen output direction is switched from the external terminal 600 of the portrait state of FIG. 15(a) to the external terminal 600 of the landscape state of FIG. 15(b), the left and right width of the display device 100 may be downsized to allow the state of FIG. 15(a) to be changed to the state of FIG. 15(b). Alternatively, after a selection menu as to whether to enlarge or downsize the display device 100 is output to a user, the display device 100 may be enlarged or downsized if there is any input for execution.

FIGS. 16(a) and 16(b) illustrate another example of a display device according to the present disclosure and an external terminal.

If a plurality of external terminals 600a and 600b are connected with the display device 100 by mirroring, a problem occurs in screen arrangement and an enlargement or downsizing level of the display device 100.

Screen arrangement when output direction information of at least one external terminal is portrait will be described with reference to FIG. 16.

For example, supposing that the external terminals 600a and 600b include a first external terminal 600a and a second external terminal 600b, if both the first external terminal 600a and the second external terminal 600b have portrait output direction information as shown in FIG. 16(a), the controller may output first screen information 601a of the first external terminal 600a and second screen information 601b of the second external terminal 600b by aligning them in a left and right direction.

At this time, if the first screen information 601a and the second screen information 601b are output by alignment in a left and right direction, the driving unit may control the output area to allow an output area other than the first screen information 601a and the second information 601b not to be generated.

Therefore, a ratio of the output area is equal to an aspect ratio of the first screen information 601a and the second screen information 601b, which are aligned in a left and right direction at the same height.

As shown in FIG. 16(b), if the first external terminal 600a has portrait output direction information and the second external terminal 600b has landscape output direction information, the first screen information 601a and the second screen information 601b may be arranged in parallel in a left and right direction in the same manner as the aforementioned embodiment. At this time, a ratio of the first screen information 601a and the second screen information 601b may be controlled such that an output vertical length of the first screen information 601a and an output vertical length of the second screen information 601b are equal to each other in the same manner as the aforementioned embodiment.

Meanwhile, if first output direction information and second output direction information include output direction information of landscape, the first screen information 601a and the second screen information 601b may be output in vertical direction arrangement. In this case, it is preferable that a vertical area of an output area may be fully filled in a state that a horizontal length of the first screen information 601a and a horizontal length of the second screen information 601b are equal to each other unlike the aforementioned embodiments.

Figure 16:
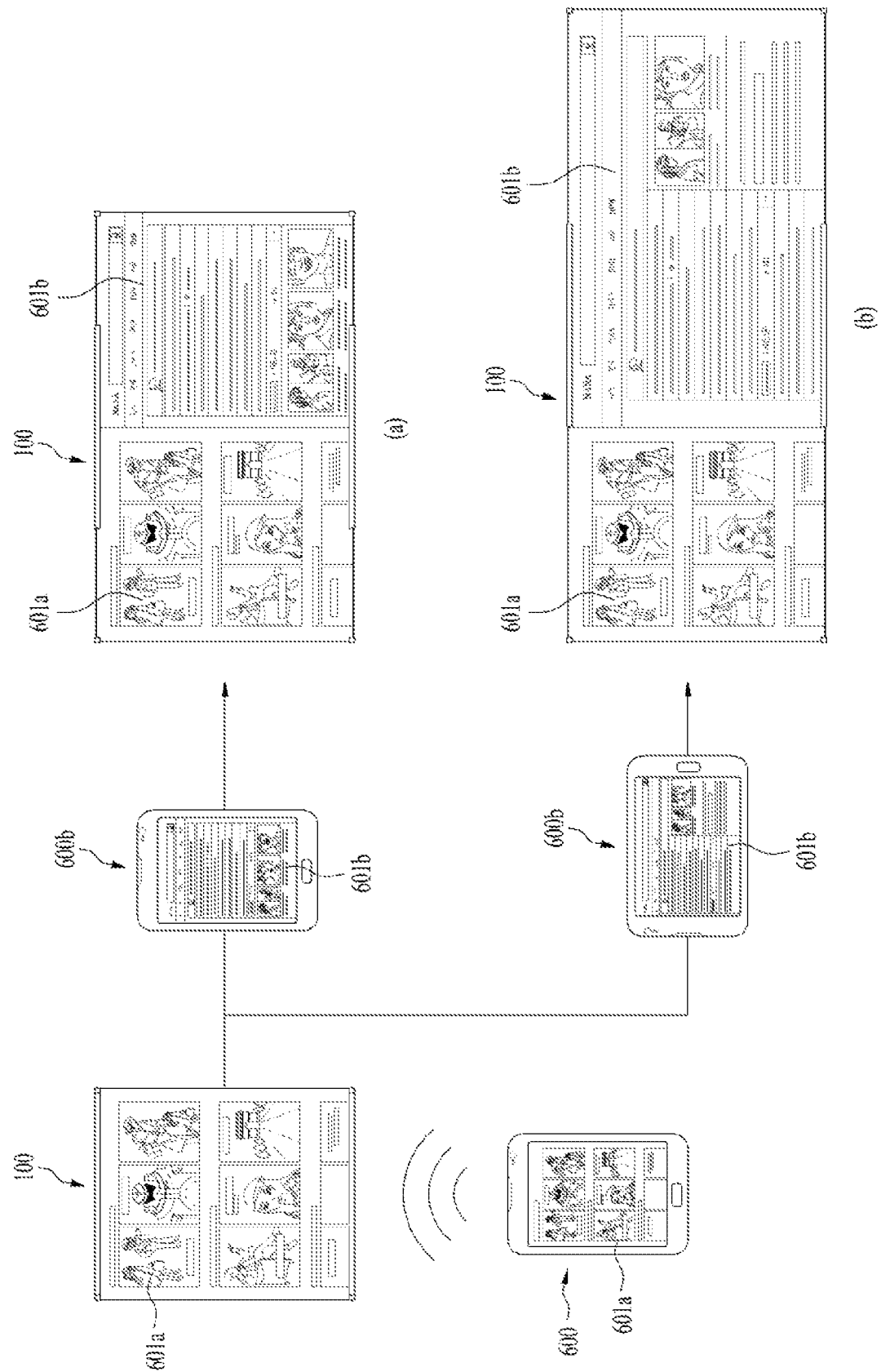
FIGS. 16(a) and 16(b) illustrate another example of a display device according to the present disclosure and an external terminal.

In a state that the first external terminal 600a is mirrored in the display device 100 as shown in FIG. 16, the second external terminal 600b may additionally be mirrored in the display device 100, whereby the screen output state of the display device 100 in FIG. 16(a) or FIG. 16(b) may be obtained. Alternatively, the first external terminal 600a and the second external terminal 600b are simultaneously mirrored in the display device 100, whereby the screen output state of the display device 100 in FIG. 16(a) or FIG. 16(b) may be obtained.

The controller may control each external terminal to have the same vertical length in screen information.

Although FIG. 16 is based on that the connected external terminal is portrait output direction information, the same principle may also be applied to landscape output direction information.

Also, the same manner may be applied to even the case that external terminals more than two as well as two external terminals are connected to the display device.

Also, the embodiments are based on the case that the plurality of external terminals are connected to the display device 100 by mirroring, a similar manner may be applied to even the case that the display device 100 outputs a plurality of channels or screens.

Figure 17:
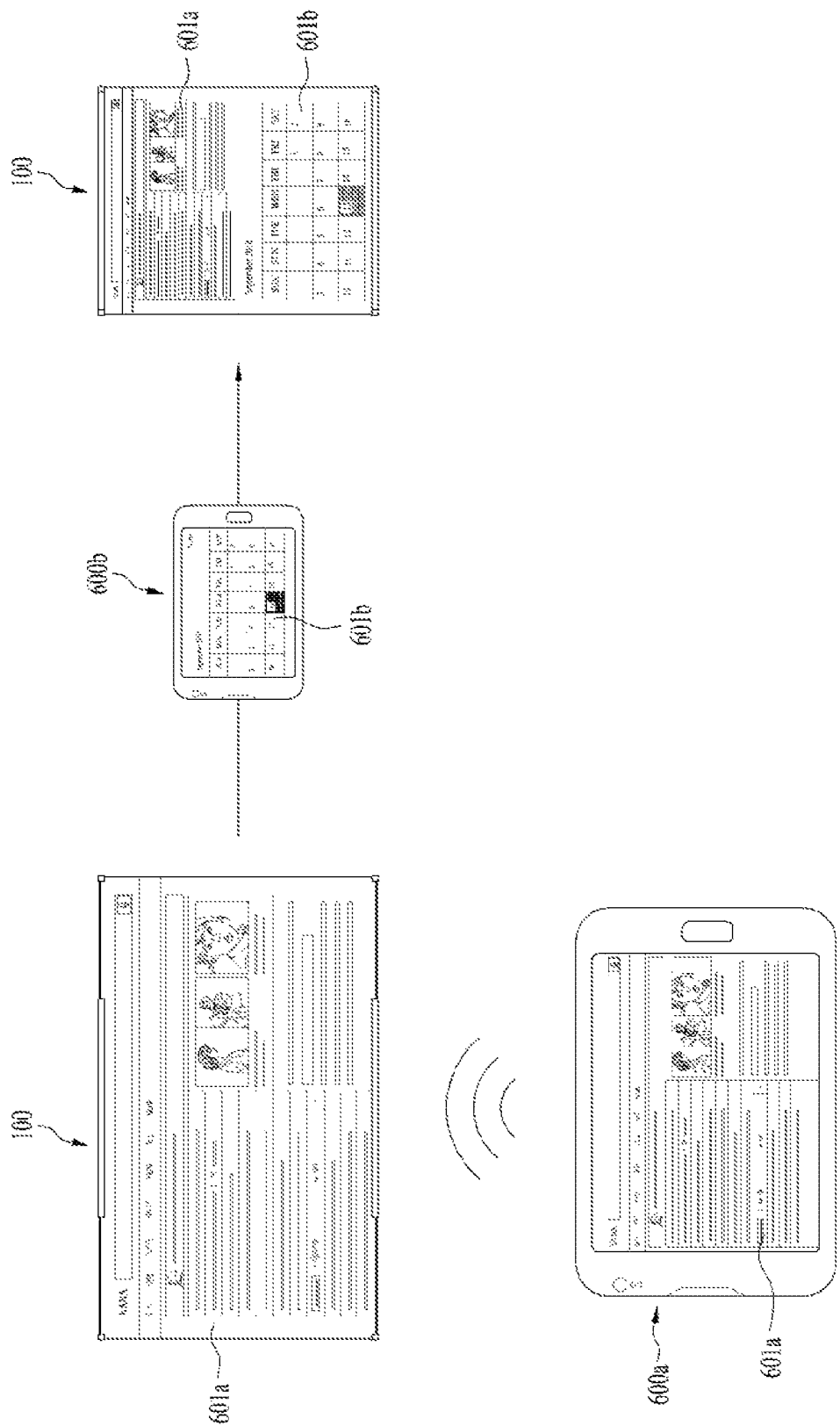
FIG. 17 illustrates another example of a display device according to the present disclosure and an external terminal.

FIG. 17 illustrates another example of a display device according to the present disclosure and an external terminal.

If both the first external terminal 600a and the second external terminal 600b have landscape output direction information, the first screen information 601a of the first external terminal 600a and the second screen information 601b of the second external terminal 600b may be output by being aligned in an up and down direction. At this time, a ratio may be controlled such that a left and right boundary between the screen information 601a and 601b of the respective external terminals 600a and 600b may be matched with a left and right boundary of the output area of the display unit, whereby an empty area of the display unit may not be generated.

Figure 18:
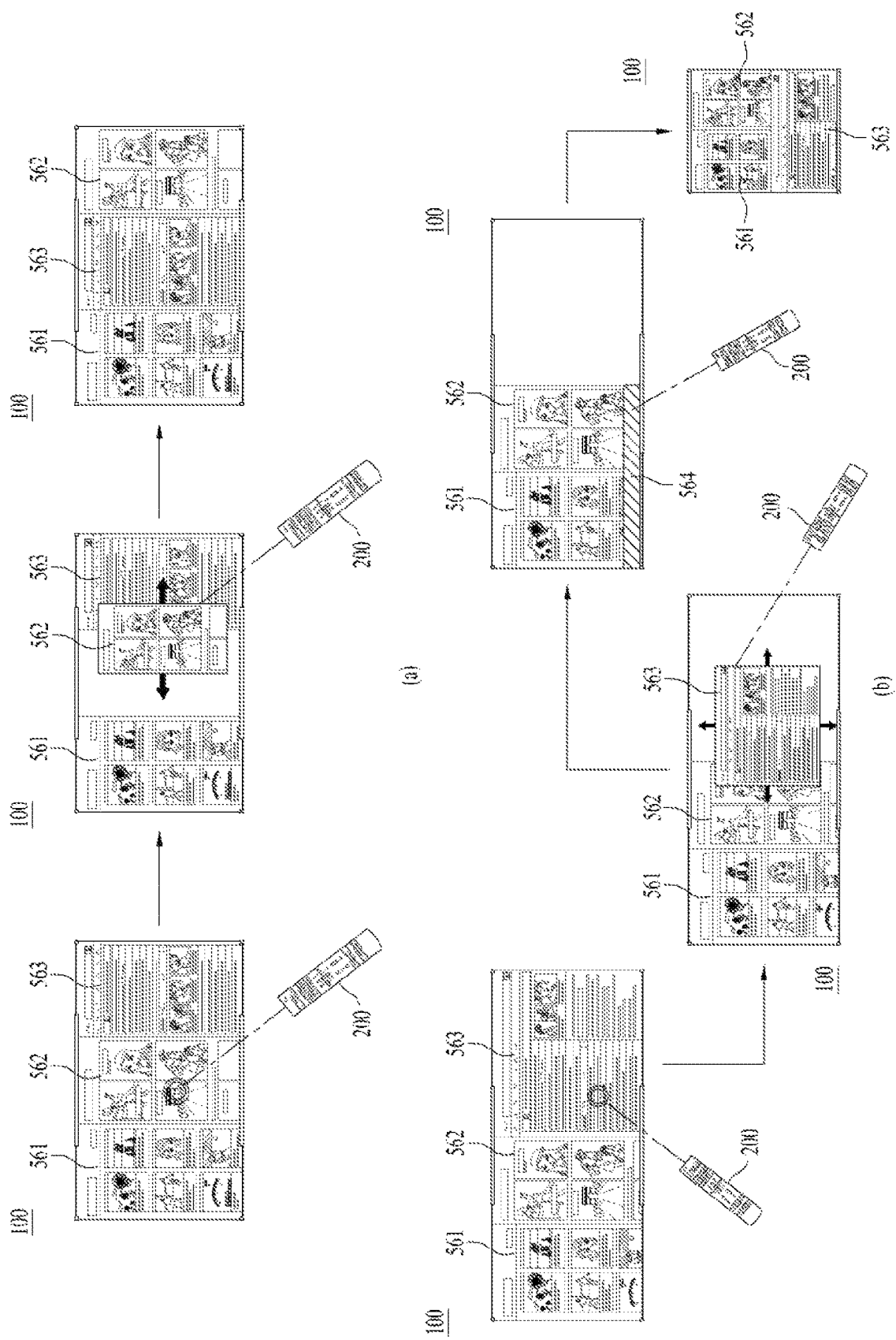
FIGS. 18(a) and 18(b) illustrate an example of a display device according to the present disclosure and an external terminal.

FIGS. 18(a) and 18(b) illustrate an example of a display device according to the present disclosure and an external terminal.

If a plurality of contents 561, 562 and 563 are output to the screen area of the display device, arrangement or size of the plurality of contents 561, 562 and 563 may be controlled.

The contents may be the screen information received from the plurality of external terminals as described above, or may be the received broadcast screen. Alternatively, the screen received from the external terminal and the broadcast screen may be output complexly.

The order of the plurality of contents 561, 562 and 563 output to the screen area may be changed in accordance with a user input. The user input for changing the order of the contents may be an input through the remote controller 200.

For example, referring to FIG. 18(a), it is supposed that the first content 561, the second content 562 and the third content 563 are arranged on the screen area in due order from a left side. In this case, when a cursor corresponding to the remote controller 200 indicates the second content 562, the second content 562 may be selected through a long-press input of the remote controller 200. Afterwards, the second content may move through a drag & drop input of the remote controller and then its position may be changed to a position of the third content 563. As a result, the first content 561, the third content 563 and the second content 562 may be output to the screen area in due order.

Alternatively, as shown in FIG. 18(b), three contents arranged in a left and right direction may be arranged in an up and down direction. In the same manner as FIG. 18(a), the third content 563 arranged at the rightmost side may move below the first content 561 and the second content 562.

The embodiment of FIG. 18(b) is different from the embodiment of FIG. 18(a) in that a ratio of the screen area as well as a ratio of at least one content is varied in accordance with a position change of at least one content. A ratio change of the screen area, that is, a slide of the extended body may be implemented as it is determined that a position of a content is changed in accordance with drag & drop.

Meanwhile, the display device may output an indicator 564 that previously indicates a position where a content will be output. For example, as shown in FIG. 18(b), if the third content 563 moves below the first content 561 and the second content 562, an indicator 464 indicating that the third content 563 will be located below the first content 561 and the second content 562 may be output. At this time, the indicator 564 may be output in the form of a bar shape such that the output area may effectively be used.

Since it is preferable that the output area of the display device 100 is changed after movement of a content is determined, the indicator 564 may notify a user of a position where a content will move, whereby the output area of the display device 100 may not be changed unnecessarily.

FIG. 19 illustrates an example of a display device 100 according to the present disclosure.

The display device 100 may control the ratio of the output screen in accordance with a property of a content which is output. The controller of the display device 100 may recognize a property of the content and control the display unit 180 to output a content to be suitable for a screen ratio corresponding to the property of the recognized content.

The screen ratio may have some specific modes. For example, a screen ratio of the display device 100 may include a 7:9 mode, a 16:9 mode, an 18:9 mode, and a 21:9 mode.

As shown in FIG. 19(a), if a content is a content 571 output from an all-ways-on display, or if a content is a vertical image 572, the content may be output in a 7:9 mode. Particularly, if a content is a content 571 output from an all-ways-on display, a speaker may be deactivated.

Alternatively, if general broadcast or a main output screen of a VOD video 573 is only output, a content may be output in a 16:9 mode as shown in FIG. 19(b).

If an auxiliary output screen 575 in addition to a main output screen 574 needs to be output, a content may be output in an 18:9 mode. The auxiliary output screen 575 may be summary information related to the main output screen 574 or summary information on a content to be output to the main output screen 574. For example, the auxiliary output screen 575 may include channel information, a live menu, or an associated menu. The auxiliary output screen 575 is advantageous in that it may provide information regardless of the main output screen 574.

Therefore, if a 16:9 mode state in which a main output mode is only output is changed to an 18:9 mode in which the auxiliary output screen 575 is also output in accordance with a user input, the extended body of the display device 100 may be slid such that the screen ratio may be changed.

Alternatively, if a category of a content is a movie 576 as shown in FIG. 19(d), the corresponding content may be output in a 21:9 mode. At this time, it is preferable to enhance a sound output by maximizing a sound output area of a speaker 510.

The above detailed description should be considered in all respects as illustrative and not restrictive. The scope of the present disclosure should be determined by reasonable interpretation of the appended claims and all change which comes within the equivalent scope of the present disclosure are included in the scope of the present disclosure.

MODE FOR CARRYING OUT THE INVENTION

Various embodiments have been described in the best mode for carrying out the present disclosure.

INDUSTRIAL APPLICABILITY

The present disclosure is used in the field related to the display device of which output area is varied depending on a property of a content.

It will be apparent to those skilled in the art that various modifications and variations can be made in the present disclosure without departing from the spirit or scope of the invention. Thus, the present disclosure is intended to include modifications and variations of the present disclosure provided within the appended claims and equivalent scope.

What is claimed is:

1. A display device comprising:
   a body including a fixed body and an extended body coupled to at least one corner of the fixed body and slidable with respect to the fixed body to enlarge or shrink a front area of the body;
   a flexible display provided on a front surface of the body, the flexible display having an output area and a non-output area wound at an end of the output area and provided on a rear surface of the output area;
   a first pinion gear provided in the body;
   a second pinion gear provided in the flexible display, for controlling a winding level of the flexible display; and
   a transmission gear jointing the first pinion gear to the second pinion gear and for delivering movement of the first pinion gear to the second pinion gear,
   wherein a ratio of the output area to the non-output area of the flexible display is variable to correspond to the front area of the body.

2. The display device of claim 1, wherein the flexible display includes:
   a display panel; and
   a display support supporting a rear surface of an output area of the display panel, and
   wherein the display panel is provided to be wound by surrounding at least one corner of the display support, and the display support controls a ratio of the output area to a non-output area of the display panel by varying an interval of a plurality of frames having different widths.

3. The display device of claim 1, further comprising:
   a rotational driver provided in the fixed body, forming a rotary shaft vertical to the output area to provide a rotational force;
   a rail including a plurality of points provided in the extended body, forming different distances from the rotary shaft; and
   a rotary arm having a first end connected with the rotational driver and a second end jointed to the rail, for delivering a sliding force of the extended body by moving the second end along the rail based on the rotational force.

* * * * *